US012583349B2

(12) United States Patent
Kulik

(10) Patent No.: US 12,583,349 B2
(45) Date of Patent: Mar. 24, 2026

(54) SELF-CHARGING ELECTRIC VEHICLE (SCEV)

(71) Applicant: Gregory Kulik, Winnetka, IL (US)

(72) Inventor: Gregory Kulik, Winnetka, IL (US)

( * ) Notice: Subject to any disclaimer, the term of this patent is extended or adjusted under 35 U.S.C. 154(b) by 1473 days.

(21) Appl. No.: 17/260,180

(22) PCT Filed: Jul. 10, 2019

(86) PCT No.: PCT/US2019/041256
§ 371 (c)(1),
(2) Date: Jan. 13, 2021

(87) PCT Pub. No.: WO2020/014398
PCT Pub. Date: Jan. 16, 2020

(65) Prior Publication Data
US 2021/0323430 A1     Oct. 21, 2021

Related U.S. Application Data

(60) Provisional application No. 62/697,723, filed on Jul. 13, 2018.

(51) Int. Cl.
| | |
|---|---|
| *B60L 53/51* | (2019.01) |
| *B60L 8/00* | (2006.01) |
| *B60L 50/60* | (2019.01) |
| *B60L 53/52* | (2019.01) |
| *B60N 2/01* | (2006.01) |
| *F03D 1/02* | (2006.01) |
| *F03D 1/06* | (2006.01) |
| *F03D 9/32* | (2016.01) |

(Continued)

(52) U.S. Cl.
CPC ............... *B60L 53/51* (2019.02); *B60L 8/003* (2013.01); *B60L 8/006* (2013.01); *B60L 50/66* (2019.02); *B60L 53/52* (2019.02); *B60N 2/012* (2013.01); *F03D 1/02* (2013.01); *F03D*

*1/0675* (2013.01); *F03D 9/32* (2016.05); *F03D 13/20* (2016.05); *H02S 10/12* (2014.12); *H02S 10/20* (2014.12);

(Continued)

(58) Field of Classification Search
CPC .......... B60L 53/51; B60L 53/52; B60L 50/66; B60L 8/003; B60L 8/006; H02S 10/12; H02S 10/20; H02S 10/40; H02S 20/32; H02S 30/20; F03D 9/32; F03D 13/20; F03D 1/02; F03D 1/0675; B60N 2/012
See application file for complete search history.

(56) References Cited

U.S. PATENT DOCUMENTS 3,374,849 A * 3/1968 Redman .................. B60L 8/006
180/2.2
5,280,827 A * 1/1994 Taylor ..................... B60L 8/006
180/2.2

(Continued)

*Primary Examiner* — John D Walters
(74) *Attorney, Agent, or Firm* — DLA Piper LLP (US)

(57) ABSTRACT

A self-charging electric vehicle configured for converting solar energy and wind energy into electrical energy comprising a systems and methods. The vehicle includes a body and frame with a central body structure and centerline cabin and a chassis with a centerline battery compartment and a suspension system. Solar cells mounted to the vehicles top sides can be supplemented with extendable solar panel(s) that can be deployed by a control system to generate solar energy into electrical energy. An omnidirectional sun sensor provides for sun strength, angle and direction. A stowable horizontal-axis wind turbine with an extendable mast mounted to the vehicle that can be deployed by a control system to generate wind energy into electrical energy. A stowable anemometer provides for wind speed and wind direction.

22 Claims, 37 Drawing Sheets

(51) Int. Cl.

| | |
|---|---|
| *F03D 13/20* | (2016.01) |
| *H02S 10/12* | (2014.01) |
| *H02S 10/20* | (2014.01) |
| *H02S 10/40* | (2014.01) |
| *H02S 20/32* | (2014.01) |
| *H02S 30/20* | (2014.01) |

(52) U.S. Cl.

CPC .............. *H02S 10/40* (2014.12); *H02S 20/32* (2014.12); *H02S 30/20* (2014.12); *F05B 2220/708* (2013.01); *F05B 2240/221* (2013.01); *F05B 2240/941* (2013.01); *F05B 2260/70* (2013.01); *F05B 2270/32* (2013.01); *F05B 2270/321* (2013.01)

(56) References Cited

U.S. PATENT DOCUMENTS

| | | | | |
|---|---|---|---|---|
| 8,295,033 | B2 * | 10/2012 | Van Straten | ............ H02S 20/30 |
| | | | | 290/55 |
| 8,299,645 | B2 * | 10/2012 | Muchow | ................ F03D 13/10 |
| | | | | 290/55 |
| 8,459,249 | B2 * | 6/2013 | Corio | .................... F24S 30/425 |
| | | | | 126/606 |
| 8,517,131 | B2 * | 8/2013 | Kovach | .............. H01M 50/249 |
| | | | | 180/68.5 |
| 8,529,206 | B2 * | 9/2013 | Numajiri | ................. F03D 7/024 |
| | | | | 416/37 |
| 8,539,724 | B2 * | 9/2013 | Bullivant | ............... H02S 10/12 |
| | | | | 52/173.3 |
| 9,441,612 | B2 * | 9/2016 | Haar | ................... E04B 1/34336 |
| 10,666,185 | B2 * | 5/2020 | Aikens | .................... H02S 10/40 |
| 2008/0308091 | A1 | 12/2008 | Corio | |
| 2009/0076161 | A1 | 3/2009 | Czarnik | |
| 2011/0176256 | A1 | 7/2011 | Van Straten | |
| 2011/0215584 | A1 * | 9/2011 | Prokopich | ............. B60K 16/00 |
| | | | | 290/55 |
| 2011/0260533 | A1 | 10/2011 | Hardin | |
| 2012/0018237 | A1 | 1/2012 | Kovach et al. | |
| 2012/0080072 | A1 | 4/2012 | Bullivant et al. | |
| 2012/0112458 | A1 | 5/2012 | Numajiri | |
| 2015/0300321 | A1 | 10/2015 | Haar | |
| 2016/0285404 | A1 | 9/2016 | Aikens et al. | |
| 2017/0023191 | A1 | 1/2017 | Magnotta | |

* cited by examiner

2416

2414

2448

2418

2446

2400

2420

2440

2444

2412

2410

2442

2408

2406

2422

2404

2424

2402

2450

2460

2470

SELF-CHARGING ELECTRIC VEHICLE (SCEV)

CROSS REFERENCE

This application is a national phase of International Application No. PCT/US2019/041256, filed on Jul. 10, 2019, which claims priority from U.S. provisional Application No. 62/697,723, filed on Jul. 13, 2018, each of which is hereby incorporated herein by reference in its entirety.

TECHNICAL FIELD

This application relates to the field of clean energy, automotive, and mechanical engineering.

BACKGROUND

Advances in technology and clean energy have allowed new vehicles to utilize different power sources than in the past.

The current landscape of clean energy vehicles deals mostly with battery operated electric automobiles. It however does not deal with harvesting renewable energy in any substantial or practical way, let alone combining harvesting energy with an electric vehicle.

Vehicles solely utilizing solar power and/or wind power are well known in the prior art. While these vehicles may fulfill their particular theoretical objectives, none are actually practical as either the vehicle itself is inefficient and/or the solar panels or the size of the wind turbine's rotor diameter is not of sufficient size, or in any combination of these.

With the exception of electric vehicles that recharge solely from renewable energy such as hydropower or wind power or solar power or in any combination of these, electric vehicles that recharge from fossil fuels and/or nuclear powered generating plants indirectly emit emissions and/or greenhouse gasses and are essentially emissions elsewhere vehicles. Depending on the fuel source including power distribution and transmission line losses an electric vehicle recharging from an electrical power plant can produce more emissions than an internal combustion engine operating on fossil fuels.

Hydrogen Fuel Cell Vehicles are also emissions-elsewhere vehicles as hydrogen is not a primary fuel and has to be produced using either electrolysis which requires energy or refined from fossil fuels producing emissions and greenhouse gases. In addition hydrogen by itself poses transportation and storage issues.

Electric vehicles that recharge solely from renewable energy such as solar power, wind power or hydropower are true zero-emission vehicles that would present a significant advantage over all the alternatives as utilization of true zero or even virtual zero-emission passenger vehicles would significantly reduce transportation's role in emissions and greenhouse gases and also reduce reliance on fossil fuels.

Solar-powered vehicles used in solar competition are very efficient and able to power solely from solar energy when solar energy is available, however they are impractical for daily commuter use as the vehicle and cabin is configured to maximize aerodynamic efficiency leaving little if any room for a driver, let alone any passengers.

Accordingly, any improvements to a vehicle's wind power generating capacity and/or solar power generating capacity in order to reduce reliance on fossil fuels would be desirable.

An aerodynamic, efficient and practical electric vehicle combined with sufficiently sized solar panels and a sufficiently sized wind generator that can directly generate abundant electrical energy from renewable sources that may allow for an electric vehicle to run solely from renewable energy and that could also provide electrical energy to the electrical grid, charge other electric vehicles, or be used to provide electrical energy to a home, or in any other application where electrical energy could be utilized would be ideal.

For the aforementioned reasons, there is a need for vehicles that can run solely from renewable energy and that may also be used to provide surplus electrical energy to wherever it may be needed. This disclosure is directed to the above problems as summarized below.

SUMMARY

Systems and methods here may be used to power a true clean-energy automobile and may also be used to supply electrical energy anywhere electrical energy could be utilized.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1:
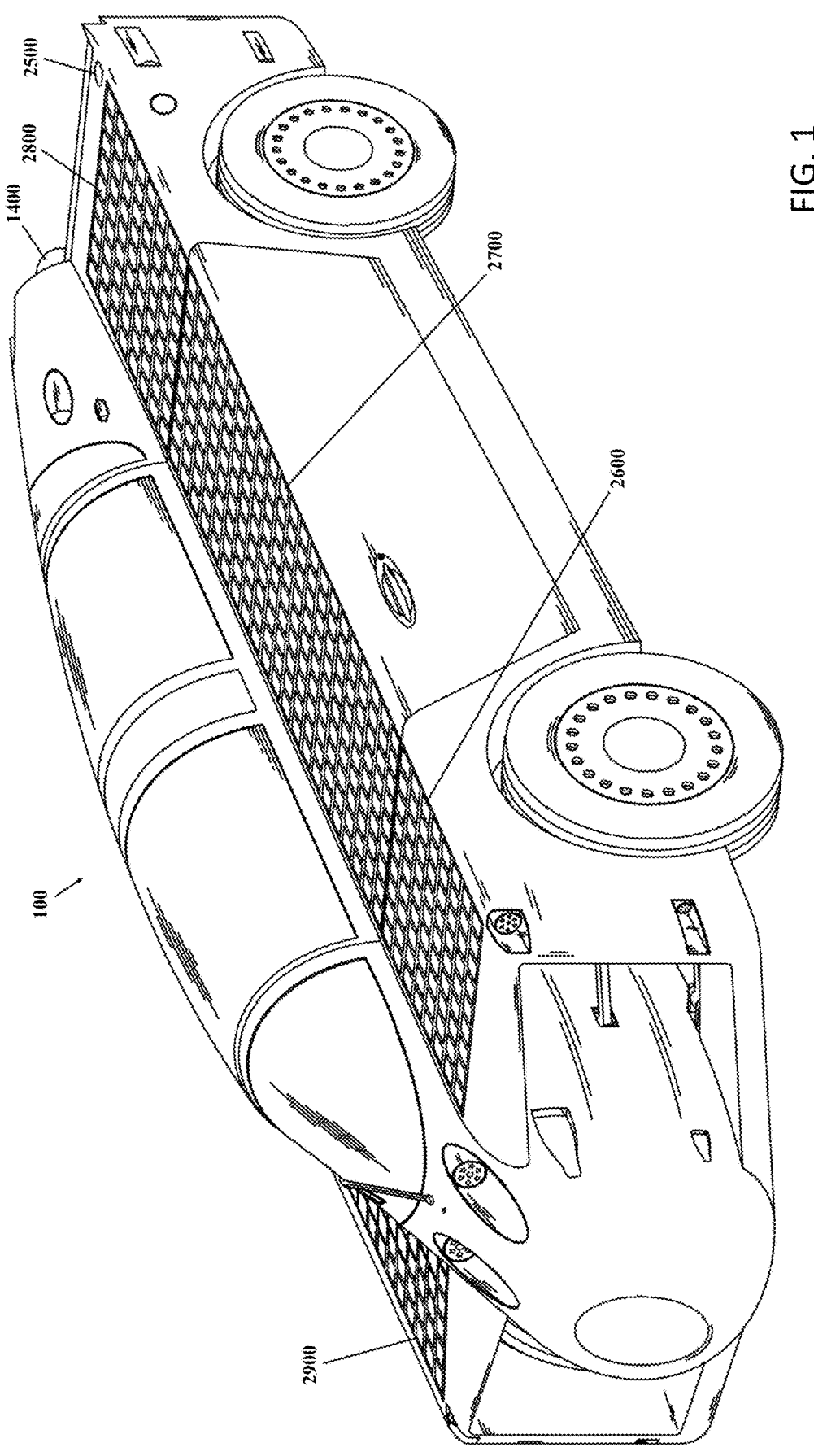
FIG. 1 is an illustration of an example front side perspective view of a vehicle, according to some embodiments.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

A self-charging electric vehicle configured for converting solar energy and wind energy into electrical energy comprising systems and/or methods are disclosed. The vehicle includes a body and frame with a central body structure and centerline cabin and a chassis with a centerline battery compartment and a suspension system. Solar cells mounted to the vehicles top sides can be supplemented with extendable solar panels that can be deployed by a control system to generate solar energy into electrical energy. A directional sun sensor provides measurements for the sun's strength, angle and direction. A stowable wind tracking horizontal-axis wind turbine with an extendable mast mounted to the vehicle that can be deployed by a control system to generate wind energy into electrical energy. A stowable anemometer provides measurements for wind speed and wind direction. The vehicle can also be utilized to supply electrical energy anywhere electrical energy would be desired including another electric vehicle, a home or to the electrical grid. In addition the stowable wind generator and/or the extending solar panels may not be limited to vehicles and may be used in any other application wherever wind and/or solar energy is desired.

Example Terms

In some examples here, terms are used to help define the systems and methods disclosed. The terms are not limited to specific definitions, but to help color the discussion, examples here describe how some terms may be used in the disclosure. For example, but not to limit the scope of any term, "anemometer" may refer to any instrument or device that can measure wind speed and wind direction; "fully deployed," "fully extended," "deployed," "deployed position," "extended," or "extended position" may refer to the described or illustrated position of the component(s) is but one of numerous positions that the component(s) or elements(s) or feature(s) can be positioned to; "control(s)" may refer to programs(s) or algorithm(s) or computer(s) or driver(s) or relay(s) that by any one alone or in any combination of can manipulate the described or illustrated device(s), component(s), element(s) or feature(s); "MPGe" and "Miles per gallon gasoline equivalent" and "mpg-equivalent" may be used interchangeably; "battery" as used herein may refer to any container consisting of one or more cells that can store electrical energy and can be used as a source of electrical power; "battery pack" as used herein may refer to a plurality of individual batteries contained within a single piece or multi-piece housing, the individual batteries electrically interconnected to achieve a desired voltage and capacity; "solar panel" and "photovoltaic panel" and "PV panel" may be used interchangeably and as used herein may refer to any device(s) that comprises at least one solar cell mounted on a panel configured to convert the energy of light into electricity; "solar cell" and "photovoltaic cell" and "photoelectric cell" and "PV" may be used interchangeably and as used herein may refer to any device(s) that converts the energy of light into electricity; "horizontal-axis wind turbine" and "horizontal-axis wind generator" and "HAWT" may be used interchangeably; "proximity sensor" may refer to any device(s) that provide close-range or long range detection of ferrous and/or non-ferrous material or provide close-range or long range detection of targets and/or objects and could be any number of contact and/or non-contact sensors that could be magnetic, electric or optical inductive including but not limited to any one of capacitive, capacitive displacement sensor, Doppler effect, eddy-current, inductive, magnetic, magnetic proximity fuse, photo-electric, photocell, laser rangefinder, passive, charge-coupled devices, passive thermal infrared, radar, reflection of ionizing radiation, lidar, cameras, active sonar, passive sonar, ultrasonic sensor, fiber optics sensor or hall effect sensor or in any combination of these; "electric vehicle" and "electric drive vehicle" and "EV" may be used interchangeably; "relay" and "computer controlled relay" may be used interchangeably; "computer controlled relay" and "computer controlled solid state relay" and "computer controlled mechanical relay" may be used interchangeably; "relay" and "switch" may be used interchangeably; "computer" as used herein may refer to any electronic device that could be used to store and manipulate information and is able to store a program and retrieve information from its memory, in some examples such computers may be programmed to manipulate a computer controlled relay driver(s); "fastener" or "fastening" or "screw" or "bolt" or "machine screw" or "machine screw and nut" or "bolt and nut" may be used interchangeably and may refer to a hardware device that mechanically joins or affixes two or more objects together; "stepper motor" as used herein is an electromechanical device which converts electrical pulses into discrete mechanical movements, the shaft or spindle of a stepper motor rotates in discrete step increments when electrical command pulses are applied to it in the proper sequence and may also rotate in either direction (clockwise or counter clockwise), the motor's position may be controlled without any feedback mechanism; "motor with rotational shaft control" as used herein is any type of motor that may include at least one rotary position sensor that can allow the rotation of the motor's shaft or spindle to rotate in steps and/or increments and that may also be connected to and manipulated by controls allowing the motor's shaft to rotate in either direction, clockwise or counter clockwise as may be manipulated by controls; "heat sink" as used herein is defined as any heat exchanger that transfers the heat generated by any electronic, mechanical or solar device including but not limited to a solar cell(s), solar panel(s), solar component(s) or any solar related component(s) or device(s) to a fluid medium such as air or liquid coolant where the heat it is dissipated away from any or all of these aforementioned items, and may include but not be limited to a passive or active design or to a combination of passive and active design; "actuator" as used herein is a device that controls or moves mechanisms and/or systems and may produce either linear motion or rotary/oscillatory motion and may be of but not limited to a hydraulic, pneumatic, electric and mechanical type design of in any combination of these; "wireless charging" or "wireless power transfer" may be used interchangeable and may refer to a device or devices that transfers wireless power utilizing various technologies such as but not limited to induction, inductive charging, inductive coupling, magnetic resonance coupling, RF radiation, resonant inductive coupling, capacitive coupling, magneto dynamic coupling, microwaves, light waves or laser; "data" or "measurements" may be used interchangeably; "sun position sensor" as used herein is defined as one or any combination of sensors and may be any sensor type and/or design such as but not limited to analog, digital, spinning, two-axis, light, solar radiation, photo sensors, photo detectors or any other sensor of light or other electromagnetic energy that may provide sun data including but not limited to the strength, position, direction and angle of the sun; "in the vehicle" means anywhere within the vehicles body, frame, chassis or component; "motion generator" may refer to any device that generates electrical energy by motion of any type and may include but not be limited to rotary motion, oscillating motion, linear motion or irregular motion. Furthermore, any numerical examples herein are intended to be non-limiting, and thus any additional numerical values, ranges, and percentages are within the scope of the disclosed embodiments.

Vehicle Body Examples

Referring to FIG. 1-7, an example embodiment of a vehicle 100 is shown having wind energy and solar energy generating components. A stowable HAWT assembly 1400 is shown in a stowed position. A solar panel assembly 2900 is shown in a stowed position. The solar panel assembly 2900 may be comprised of one or more panels and may include one or more extendable panels. The vehicle 100 may include solar panels attached to or made out of the actual body of the vehicle 100. In some examples, the vehicle 100 may include a left front upper deck fixed solar panel 2600, a door fixed solar panel 2700, and a left rear upper deck fixed solar panel 2800.

In some example embodiments, in order for an operator or user to determine which direction the wind is coming from, in order to best deploy an optimal turbine configuration, a stowable anemometer 2500 may be mounted in or on the vehicle 100 capable of being in a deployed or stowed position.

In some example embodiments, a variety of proximity sensors may be arranged on the vehicle 100 body. Such sensors could be any number of sensors including but not limited to radar, lidar, sonar, cameras, or a combination of these or other sensors. The positioning of such sensors may be in any of various places as shown in, but not limited to FIGS. 2, 6 and 7. For example, the vehicle 100 may include a front top proximity sensor 170a, a rear top proximity sensor 170b, a front side proximity sensor 170c, a middle side proximity sensor 170d, and/or a rear side proximity sensor 170e.

In examples where sensors may be stowed, these stowed configurations may help to reduce the aerodynamic drag of the vehicle 100 when driven. In examples with wind energy generating and solar energy generating capable components, they may be able to be manually or automatically deployed when the vehicle 100 is stationary.

The wind energy generating and solar energy generating components are described in more detail in FIGS. 14-37.

Figure 3:
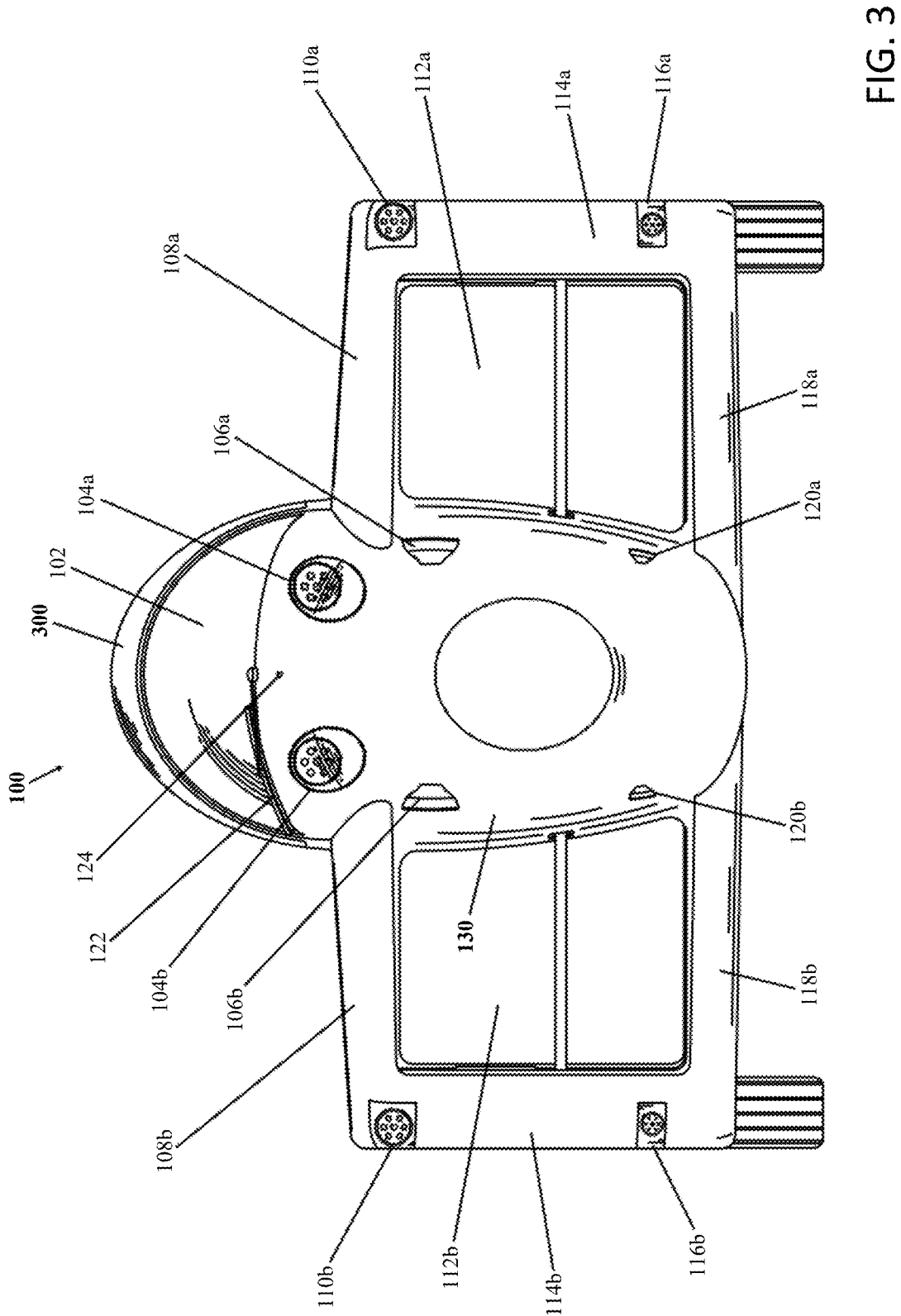
FIG. 3 is an illustration of an example front view of a vehicle, according to some embodiments.
Figure 4:
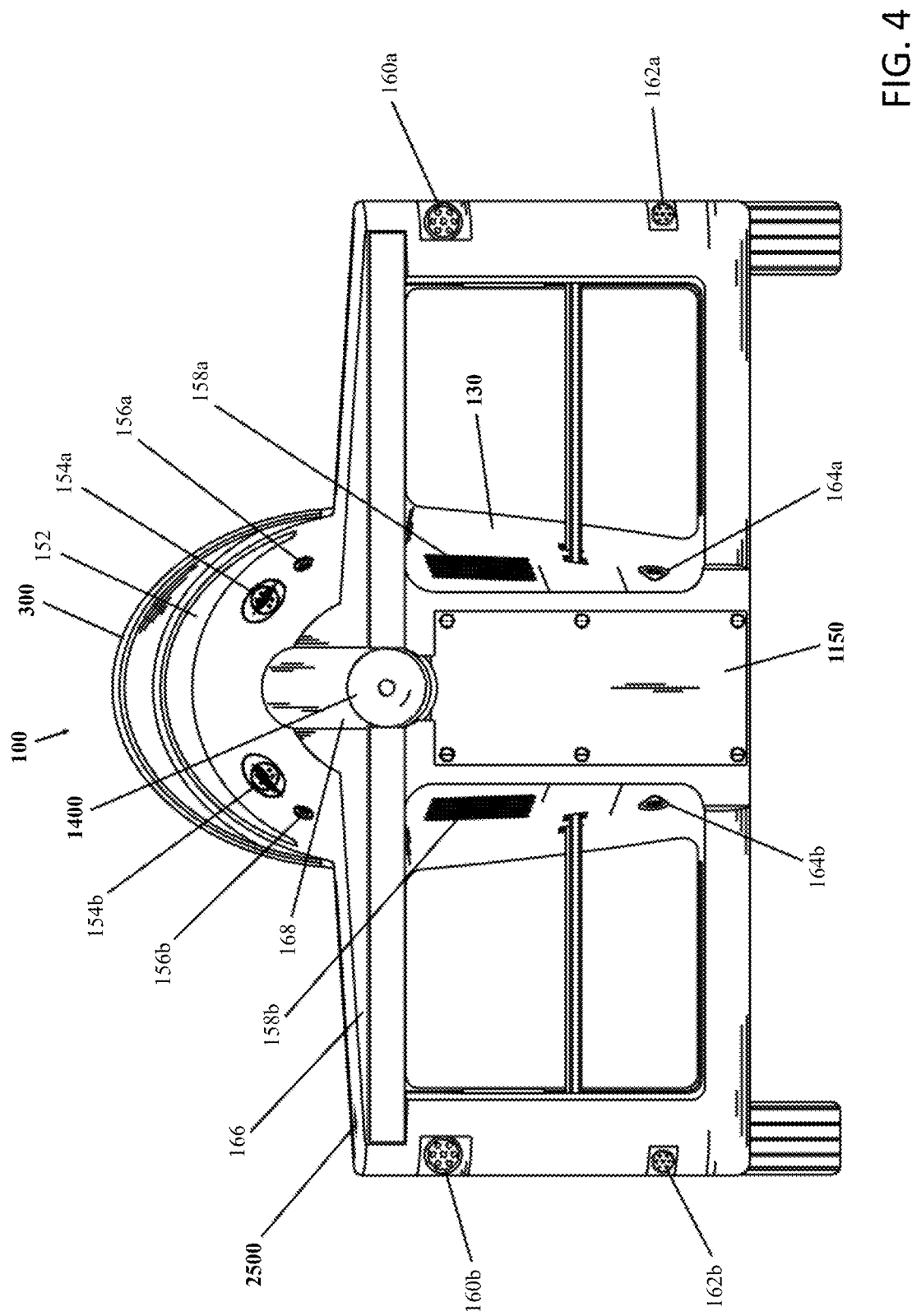
FIG. 4 is an illustration of an example rear view of a vehicle, according to some embodiments.

Still referring to the overall general vehicle, FIG. 3 and FIG. 4 show examples where the vehicle 100 includes a front windshield 102, a left front headlight 104a, and a right front headlight 104b. These headlights may be any number of LED lights or any other light technology arranged in any of various places on the vehicle 100. Some examples of the vehicle 100 may include any of other various light arrangement such as but not limited to a left front upper light 110a, a right front upper light 110b, a left front lower light 116a, a right front lower light 116b in any arrangement. Some examples include a right rear center light 154a, and a left rear center light 154b, a right rear upper light 160a, a left rear upper light 160b, a right rear lower light 162a, and a left rear lower light 162b.

In some examples, the vehicle 100 chassis itself is configured to allow for a maximum upper surface area to include solar panels for solar energy collection including a central body structure 130. Additionally, in order to cut down as much as possible on aerodynamic drag while in operation, the vehicles 100 body may be tapered towards the rear on some or all of the vehicles 100 body. In another example the vehicle 100 may include a left front cabin air scoop 106a, and a right front cabin air scoop 106b. In another example, the vehicle 100 may include a left upper deck 108a, and a right upper deck 108b. In some examples, these upper decks 108a, 108b, may be integrated with or be mounted with a solar collection system. In some examples the upper decks 108a, 108b, may be tilted allowing water to runoff thereby allowing the solar panels to be self-cleaned by rain water. Some examples include a right rear vent 158a and a left rear vent 158b. The vehicles 100 width may be extended thereby providing more upper surface area for larger solar panels and also providing for a wind turbine with a larger rotor diameter.

In some examples, the vehicle 100 chassis includes a left front battery compartment air scoop 120a, a right front battery compartment air scoop 120b, a left bypass air duct 112a, a right bypass air duct 112b, a left side outer body 114a, a right side outer body 114b, a left lower deck 118a, a right lower deck 118b, in any of various configurations. The left bypass air duct 112a and right bypass air duct 112b may provide for an air passage longitudinally from the front to back of the vehicle 100 when the vehicle 100 is being driven thereby provides for minimizing the aerodynamic drag. In another example the bypass air ducts 112a, 112b may each or both be any shape including but not limited to an oval, rectangular, triangular shape or in any combination of these shapes.

Some example embodiments include a windshield wiper 122, a windshield fluid nozzle 124, and a rear windshield 152.

In some examples, various sensors may be arranged on the vehicle 100. For example, right rear view camera 156a, a left rear view camera 156b, and a front top proximity sensor 170a, a rear top proximity sensor 170b, a front side proximity sensor 170c, a middle side proximity sensor 170b, and a rear side proximity sensor 170e. As discussed, the sensors could be any of various sensors in any combination, used by the system to detect obstacles, other vehicles, road features, wind, solar energy, or other various things. Data collected from these sensors may be sent to any of various computer components which may use that data to make determinations, provide signal information for a driver, send collected data by antennae to a back end server system, etc.

In some examples, the vehicle 100 may include features used to keep the battery components cool. Such example features may include but are not limited to a right rear battery compartment vent 164a, and a left rear battery compartment vent 164b. Any of various fans, or other features may contribute to cooling the battery components, motors, or other features which may increase in temperature during operation. Air scoops 106a, 106b may be used to provide for air circulation to the cabin 140.

In examples where a horizontal-axis wind turbine is utilized, the vehicle 100 may include various features such as a blade docking platform 166. In some examples, a wind generator docking well 168 may be integrated into the vehicle 100.

Figure 5:
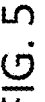
FIG. 5 is an illustration of an example left side view of a vehicle, according to some embodiments.

In some examples shown in FIG. 5, the vehicle 100 may include features used to keep the battery charged and/or may be used to connect the vehicles 100 wind and/or solar generating components to the electrical grid or to recharge other electric vehicles or to supply electrical power to a house or in any combination. Such example features may include but are not limited to at least one electrical plug or connector stowed in an electrical plug compartment 172.

Figure 6:
FIG. 6 is an illustration of an example right side view of a vehicle, according to some embodiments.

In some examples shown in FIG. 6, the vehicle 100 may include a spare wheel compartment 200 for storing a spare tire and tools which may include a car jack and tire iron.

Figure 7:
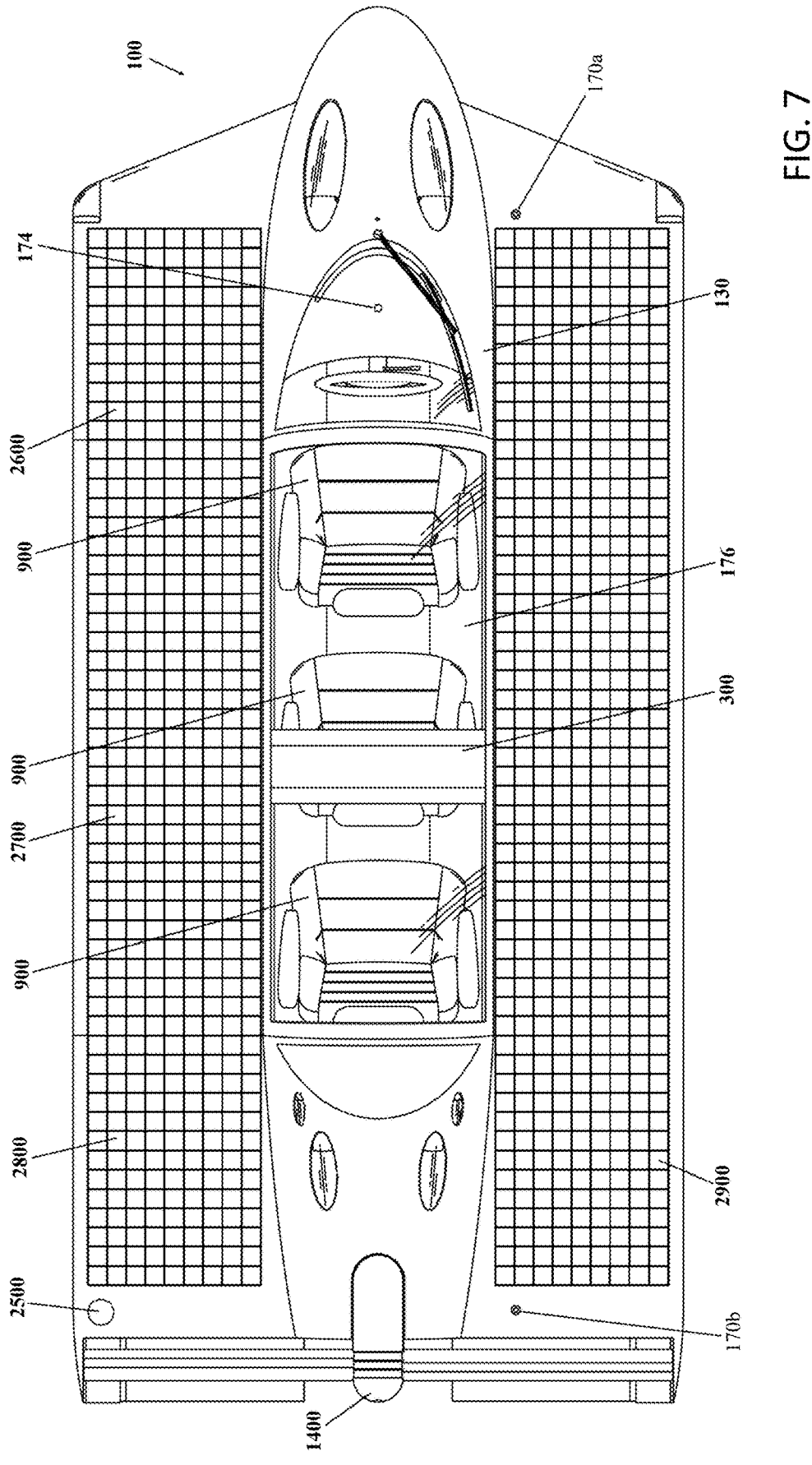
FIG. 7 is an illustration of an example top side view of a vehicle, according to some embodiments.

Referring to FIG. 7, an example of an omni-directional sun sensor 174 is shown that that may provide sun strength and position data including the sun's azimuth and angle in relation to the direction of the vehicle 100. In another example sun data may be provided by any number and any variety of sensors, designs and/or sensing technologies and in any combination that may detect the strength, position, azimuth and angle of the sun. The positioning of such sensors may be in a location as shown in, but not limited to FIG. 7. Data collected from the sensor(s) may be sent to any of various computer components which may use that data to make determinations, provide signal information for a driver, send collected data by antennae to a back end server system, etc. This configuration allows a stowable solar panel assembly 2900 to be manipulated into various deployed positions that may be favorable to generating solar energy.

Figure 8:
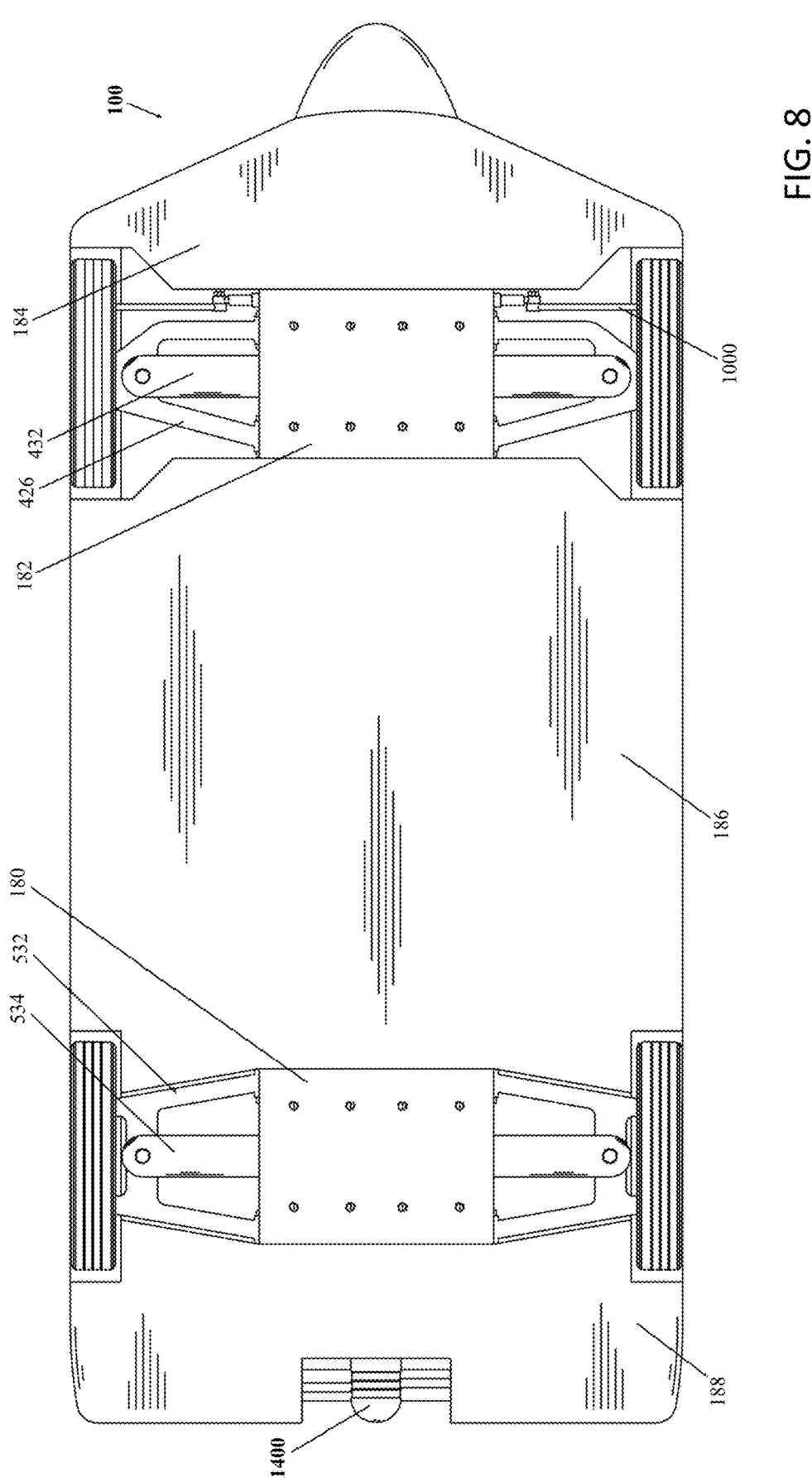
FIG. 8 is an illustration of an example bottom side view of a vehicle, according to some embodiments.

In some examples shown in FIG. 8, a vehicle 100 body/chassis may include a rear suspension access panel 180, a front suspension access panel 182, a front bottom panel 184, a center bottom panel 186, and a rear bottom panel 188. Examples of suspension components may be shown partially and may include a right rear lower control arm 532, and a front leaf spring 432, and a rear leaf spring 534, and a right front lower control arm 426. An example of a steering assembly 1000 is shown partially. This configuration may allow a reduction in aerodynamic drag while the vehicle 100 is in operation In some examples spaces within the vehicle 100 including but not limited to the cabin, the front or rear compartment or outer body or upper decks or under any of the solar panels may be used as storage compartments that may be accessed by various ways including but not limited to a removable panel or hinged panel.

Cabin Door Examples

Figure 9:
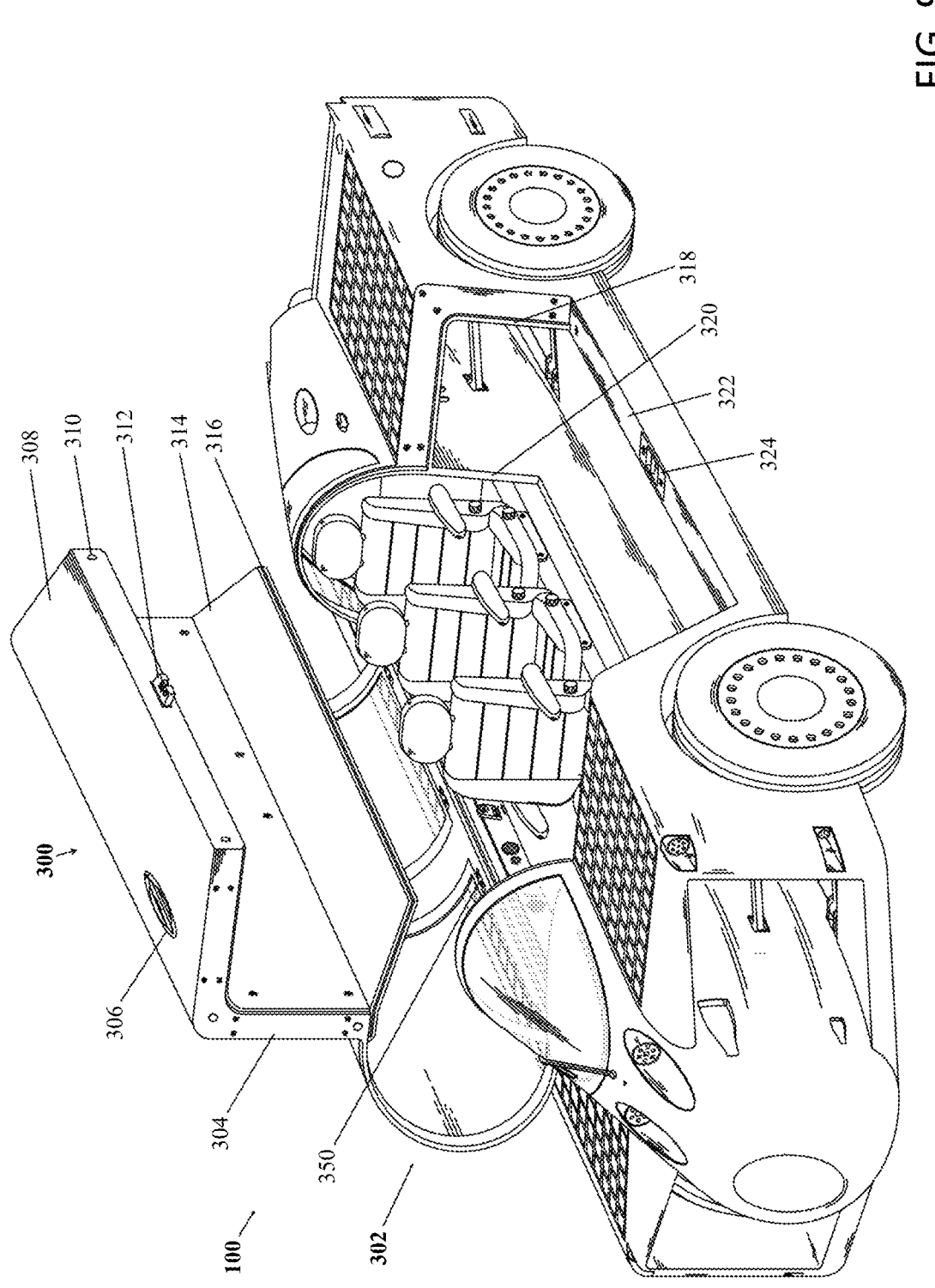
FIG. 9 is an illustration of an example front side perspective view of a vehicle with a cabin door in an open position, according to some embodiments.

Referring to FIG. 9, an example of a vehicle 100 is shown having a cabin door 300 providing the vehicles 100 occupants with an entrance to or from the vehicle 100. In some examples the cabin door 300 may be configured to open from the left or right of the vehicle 100. The cabin door 300 may include a canopy structure 302, an upper deck 304, a door handle 306, an outer door panel 308, a door bumper 310, a door lock 312, an inner door panel 314, a cabin door seal 316, a door stop 318, an inner door panel stop 320, a door sill 322, a strike plate and bolt 324 and double bolt hinge assemblies 350. The cabin door's 300 components are described in more detail in FIG. 10.

Figure 10:
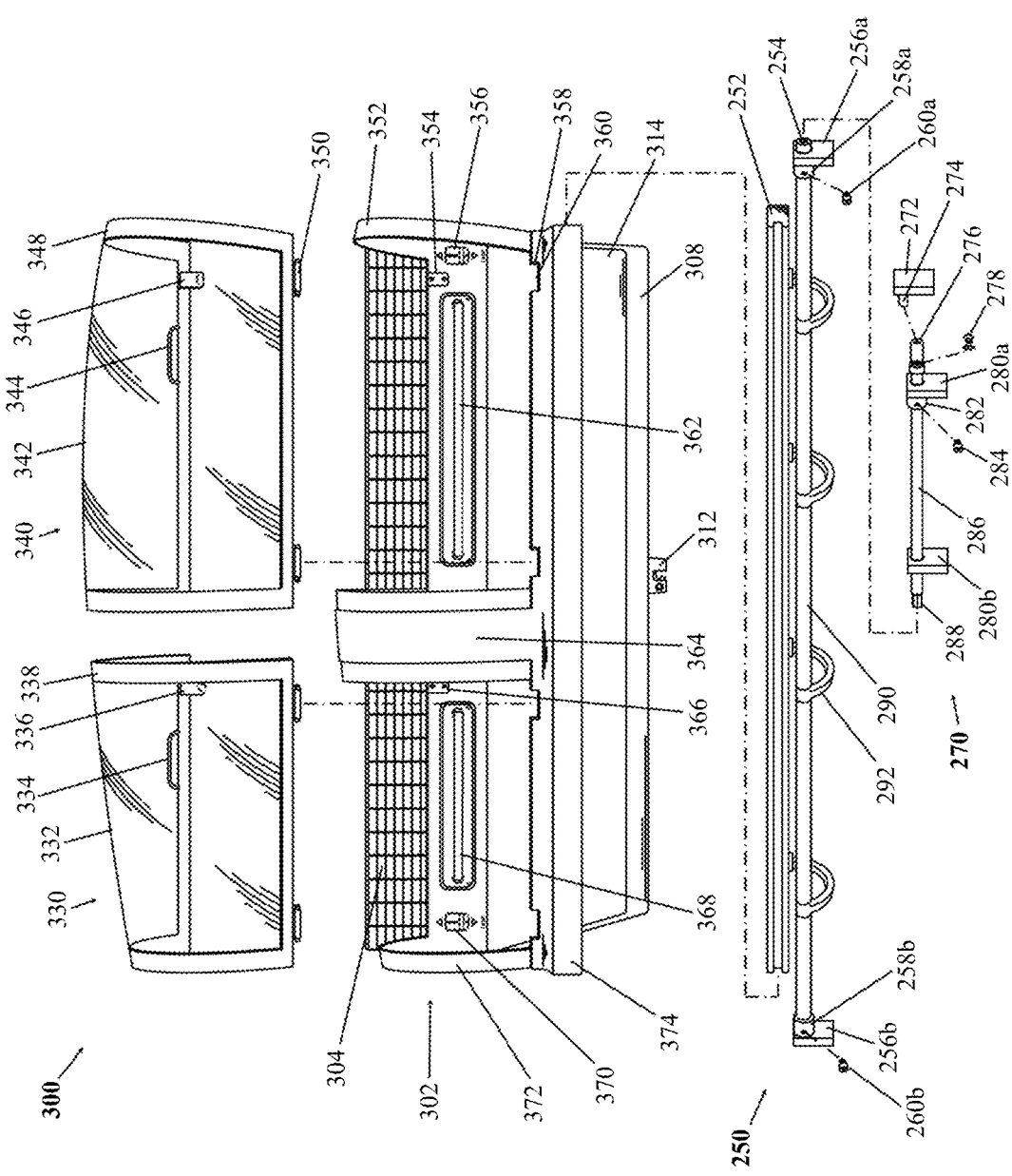
FIG. 10 is an illustration of an example exploded right perspective view of a cabin door, according to some embodiments.

Referring to FIG. 10, an example of a cabin door 300 in an exploded view is shown providing the vehicles 100 occupants ingress to and egress from the vehicle 100. The cabin door is comprised of an upper deck 304, a rear canopy 330, a rear canopy windshield 332, a rear canopy handle 334, a rear canopy lock 336, a rear canopy frame 338, a front canopy 340, a front canopy windshield 342, a front canopy handle 344, a front canopy lock 346, a front canopy frame 348, a double pin hinge assembly 350, a front canopy strike plate 354, a front door lock 356, a hinge sleeve 358, a hinge cutout 360, a front cabin door handle 362, a rear canopy strike plate 366, a rear cabin door handle 368, a rear door lock 370, a hidden door hinge assembly 250, and a torsion bar assembly 270. The cabin door 300 may include a canopy structure 302 comprised of a front canopy support 352, a middle canopy support 364, and a rear canopy support 372, which may be used for attaching a rear canopy 330 and a front canopy 340.

In some examples double bolt hinge assemblies 350 may be attached to a rear canopy 330 and a front canopy 340 that allows the canopies to be attached pivotally to pairs of hinge sleeves 358 located on the cabin door 300 in FIG. 10.

The canopies 330, 340 may include a rear canopy lock 336 having a bolt that can insert into a rear canopy strike plate 366 and a front canopy lock 346 having a bolt that can insert into a front canopy strike plate 354. This configuration allows for the canopies to be locked in a closed position or partially tilted up that may provide for cabin ventilation.

In another example the canopies 330, 340 may be fully removed from the door 300 by compressing a pair of spring loaded double bolt hinge assemblies 350 attached to each canopy which may retract the two bolts from the hinge sleeves 358 thereby freeing the canopies from the door 300. The double bolt hinge assemblies 350 may be comprised of a spring positioned between two bolts in the barrel of a hinge wherein the spring presses against the bolts causing the bolts to remain in the hinge sleeves 358. Moving the two bolts together compresses the spring and allows for the bolts to retract from the hinge sleeves 358. The double bolt hinge assemblies 350 may include a knob attached to each bolt for manually compressing the spring from inside the canopies as shown in FIG. 9.

Referring to FIG. 10, an example of a hidden door hinge assembly 250 is shown configured for attaching the cabin door 300 in a pivoting arraignment to the vehicle 100 by mounting the cabin door mounting bar 252 inside a cabin door mounting channel 374.

The hidden door hinge assembly 250 may include a torsion bar connector sleeve 254, a front mounting plate 256a, a rear mounting plate 256b, a front bar limit collar 258a, a rear bar limit collar 258b, a collar lock setscrew 260a, a collar lock setscrew 260b, a door hinge bar 290 and a hinge arm 292.

In another example the hidden door hinge assembly 250 may include at least one torsion bar assembly 270 comprising an arm stop mounting plate 272, an arm stop pin 274, a torsion anchor arm 276, a lock screw 278, a front mounting plate 280a, a rear mounting plate 280b, a torsion bar limit collar 282, a collar lock setscrew 284, a torsion bar 286 and a mounting stud 288 which allows for the torsion bar assembly 270 to be attached to the hidden door hinge assembly 250. The torsion bar assembly 270 allows for the cabin door 300 to be partially or fully counter balanced.

Chassis Examples

Figure 11:
FIG. 11 is an illustration of an example exploded rear perspective view of a chassis, according to some embodiments.

Referring to FIG. 11, an example embodiment of a chassis 400 is shown having suspension, steering, frame/body attachment and support components including a front end section, a cabin section and a rear end section. In examples where suspension components may be partially or fully hidden, these hidden configurations may help to reduce the aerodynamic drag of the vehicle 100.

In some examples, the chassis 400 includes a front end section 410 having a right front end spacer 412, a right front upper spacer 414, and a right front lower spacer 416 for providing intermediate support for attaching the frame/body. The front end section 410 may include a front end structure 418 having a tapered shape towards the front that may provide a crumple zone for absorbing the force of an impact from a collision.

In some examples the front end section 410 may include suspension components. Some examples may include a front upper control arm bracket 420 and a front lower control arm bracket 422 for attaching the right front upper control arm 424 and a right front lower control arm 426. The control arm brackets 420, 422 may be used for attaching a right front wheel assembly 440 and a left front wheel assembly 442. The left front wheel assembly 442 may include a upper ball joint 444 and a upper ball joint nut 456 and a lower ball joint 446 and a lower ball joint nut 460 for attaching to the upper and lower control arms and a steering arm 448 and a tie rod nut 458 for attaching the steering link allowing the wheel to be manipulated by the steering components.

In some examples the wheel assembly 442 components may include a front left steering knuckle 450 that may mount to the wheel and brake components that may include a front left disk brake rotor 452 and a front left brake caliper 454 that may attach to a 430 brake line connector. The brake components may be used for stopping the vehicle 100. The brake lines may be housed in a brake line tube 428 attached to the lower control arms that help to shield the brake lines and helps reduce aerodynamic drag.

In some examples the suspension components may include a left front shock absorber 462 and a right front shock absorber 436 in which the rod end at the bottom of the shock absorber is attached to the lower control arms. The shock absorbers may contribute to limiting excessive suspension movement and to damp spring oscillations.

In some examples the suspension components may include a front leaf spring 432 which may attach to the left front lower control arm and a right front lower control arm 426 by a leaf spring bolt and nut assembly 434 and a rear leaf spring 534 which may be attached to a left rear lower control arm and a right rear lower control arm 532 by a leaf spring bolt and nut assembly 536. The front and rear leaf springs 432, 534 may be attached to the bottom portion of a right lower chassis rail 604 and a left lower chassis rail 608. The front and rear leaf springs 432, 534 allows the vehicle 100 to maintain its height including absorbing impacts while traveling over rough terrain roads.

In some examples the suspension components may include a right rear shock absorber 546 and a left rear shock absorber 574, in which the rod end at the bottom may attach to a wheel shock absorber mounting bracket 560. The shock absorbers contribute to limiting excessive suspension movement and to damp spring oscillations.

Additional examples may show a rack and pinion steering housing 438 for shielding and attaching the steering assembly.

In some examples, the chassis 400 includes a rear end section 500 having a right rear upper spacer 510, a right rear end upper spacer 512, and a right rear end lower spacer 514 for providing intermediate support for attaching the frame/body. The rear end section 500 may have a tapered shape towards the rear that provides a crumple zone for absorbing the force of an impact from a collision.

In some examples the rear end section 500 may include suspension components. Such examples may include a rear upper control arm bracket 516 and a rear lower control arm bracket 528 for attaching the right rear upper control arm 530 and a right rear lower control arm 532 for attaching a right rear wheel assembly 548, and a left rear wheel assembly 570.

In some examples the left rear wheel assembly 570 may include a wheel shock absorber mounting bracket 560 which may attach to the rod end at the bottom of a left rear shock absorber 574.

In some examples the left rear wheel assembly 570 may include a wheel brake line connector 562 that may connect to a brake line connector 538, wherein the brake line itself is housed in a brake line tube 540, wherein the brake line may connect to a brake assembly for stopping the vehicle 100.

In some examples the left rear wheel assembly 570 may include lower wheel control arm brackets 564 and upper wheel control arm brackets 568 for attaching the wheel assembly 570 to a right rear upper control arm 530 and a right rear lower control arm 532 with a control arm mounting bolt and nut set 576.

In some examples the wheel assembly 570 may include a wheel motor 572 having a wheel power plug socket 566 that may connect to a power plug 544 that may supply power from a power source to the wheel motor 572. The power plug 544 cable may be housed in a power cable tube 542 that is attached to the rear lower control arms.

In some examples the rear end section 500 shows the vehicle 100 configured with two wheel motors however in another example any number of wheel motors may be used.

In another example the vehicle 100 may be powered with at least one electric motor mounted to the chassis 400 that may linked by at least one drive shaft to at least one wheel and that may use one or more gears to reduce or increase the rotation of the drive shaft.

In another example the rear end section 500 may be comprised of a cooling system that may include at least one radiator 674 having an upper coolant hose connector, a lower coolant hose connector, an expansion tank and cap 678, and a pair of cooling fans 676.

In another example a cooling system may include at least one coolant pump, at least one temperature sensor and controls for managing the coolant temperature and/or coolant flow thereby providing a means for cooling a battery pack.

Battery Compartment Examples

Referring to FIG. 11, an example of a chassis 400 is shown having a battery compartment 600 that may include a right lower chassis rail 604 and a left lower chassis rail 608 attached to the bottom of the battery compartment 600 that may add strength to the chassis 400 in addition to providing attachment areas for other components.

Figure 12:
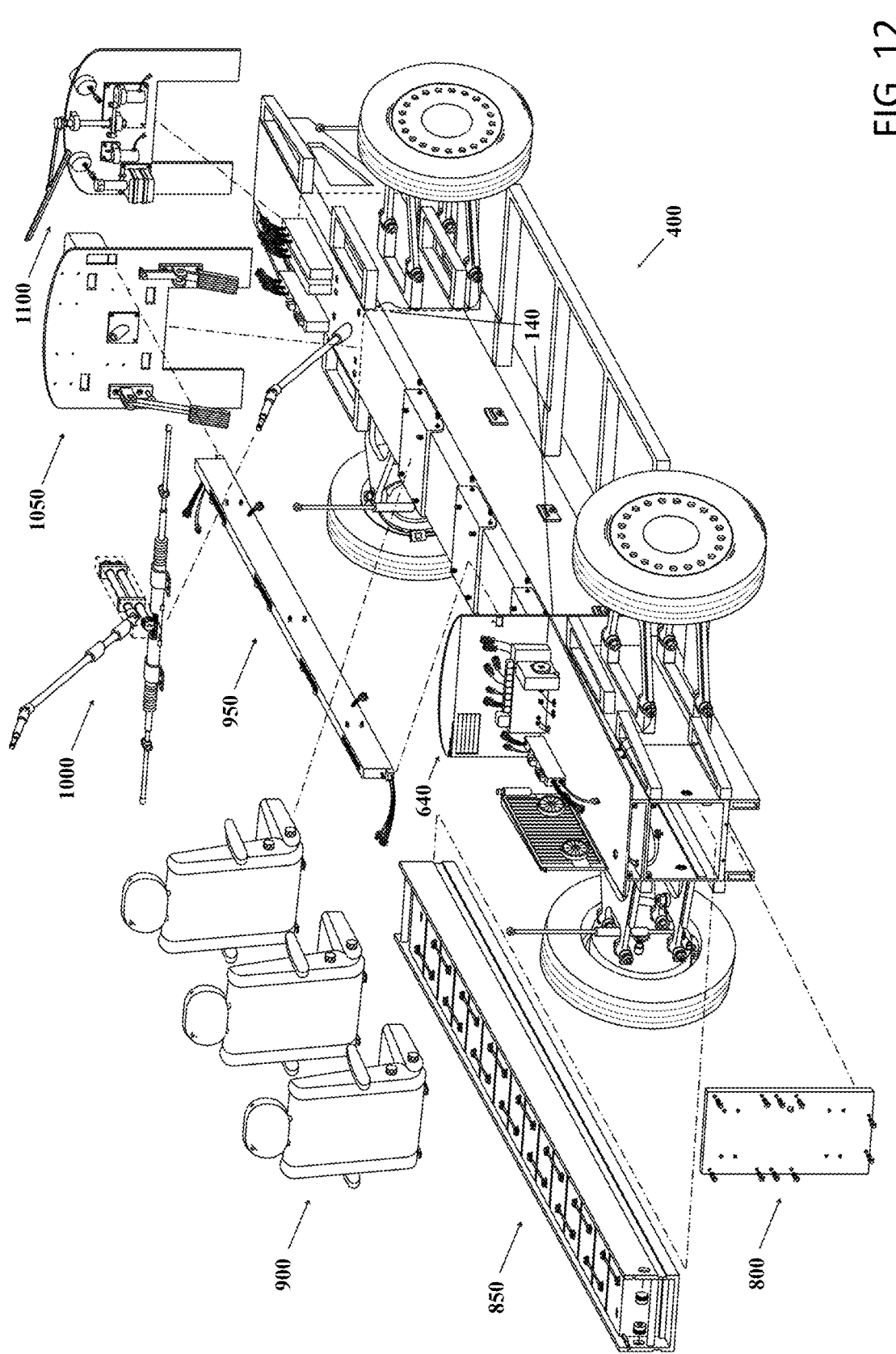
FIG. 12 is an illustration of an example exploded view showing an assemblage of various assemblies and components, according to some embodiments.

In other examples the battery compartment 600 may include a pair of battery pack lock threads 602 for locking a battery pack assembly 850 shown in FIG. 12 and a pair of hold down rails 612 for securing a battery pack assembly 850.

In other examples the battery compartment 600 may include mounting threads 610 for attaching a battery compartment cover 800 shown in FIG. 12.

In other examples the battery compartment 600 may include at least one rear wire harness cutout 614 that may be used for routing for example any combination of electrical wires, cables or conduit, and a rear compartment deck 616 that may be used for mounting various components.

Utility Channel Examples

Referring to FIG. 11, an example of a chassis 400 is shown having a utility channel 620 that may be attached to the battery compartment 600 having brake line cutouts 622 that may be used for routing brake lines, an accelerator cable cutout 624 that may be used for routing the accelerator cable, and wire harness cutouts 626 that may be used for routing various electrical wires. The utility channel 620 may provide reinforcement for the chassis and may be used for routing and/or housing various battery compartment 600 components.

Rear Firewall Examples

Referring to FIG. 11, an example of a chassis 400 is shown having a rear firewall 640 that may include a cabin exhaust vent 642 having one way flaps, and a vent and wire harness assembly mount 644 for attaching a vent and wire harness assembly 950 shown in FIG. 12.

Cabin Examples

Referring to FIG. 11, an example of a chassis 400 having a cabin 140 is shown bordered in the fore-aft direction of the vehicle 100 by a rear firewall 640 and by a front inner firewall assembly 1050 and bordered on the left and the right side by a frame step 672 that is part of the lower deck support frame 670 located on the left and the right side of the chassis 400. The frame steps 672 may also provide a border for the cabin floor 176 shown in FIG. 7. The cabin's 140 fore-aft borders are also shown in FIG. 12 situated between the rear firewall 640 and the front inner firewall assembly 1050. The cabin 140 may include at least one seat bracket 650 shown in FIG. 11 having a plurality of seat mounting studs 652 for attaching a seat 900 shown in FIG. 12 and a plurality of bracket set screws 654 that may be used to secure the bracket/seat to the utility channel 620. The seat bracket 650 may be used to adjust the seat in a fore or aft direction in addition the bracket set screws 654 may be removed to allow for a seat(s) 900 to be removed from the cabin. The cabin may include at least one seat belt anchor 656 and at least one seat belt buckle 658 for each seat that may provide for the installation of seat belts.

Power, Computer, Relay Examples

Referring to FIG. 11, an example of a chassis 400 is shown having power and control components including battery cables 700 for connecting to a battery pack and a charge controller 702 that may be used for regulating the voltage and/or current generated from the solar panels and/or wind turbine going to the battery pack.

In another example the charge controller 702 may include fuses and relays. Also shown is an example of a rear power distribution, fuse, relay and controller box 704 having a power cable 706 for a left wheel motor and a power cable 708 for a right wheel motor, the controller 704 may be connected to a potentiometer 710 that may read the setting of the gas pedal as set by the driver. With input from a potentiometer 710 the controller part of the rear power distribution, fuse, relay and a controller box 704 may control the transfer of power to a wheel motor from the battery to regulate the speed of the vehicle 100. The potentiometer 710 shown may be directly connected through a cable to the gas pedal. The gas pedal may be measured by any number of other devices that can provide input to the controller part of the rear power distribution, fuse, relay and controller box 704 including but not limited to a "hall effect sensor(s)" or an Electronic Throttle Control system.

In another example the power distribution, fuse, relay and controller box 704 may be used for controlling and/or providing power to various components.

Referring to FIG. 11, an example of a chassis 400 is shown having a front power distribution, fuse and relay box 712 that may be used for controlling and/or providing power to various components. Other control components may include a computer 714, and a relay box 716, that may be used for providing control and/or power to devices that may be used for deploying or stowing wind generating and/or solar generating systems and/or their components.

Computing Device Examples

Referring to FIG. 11, an example of a computing device is shown, computer 714 that may be used in practicing certain example embodiments described herein. Such computing device, computer 714 may be integrated into the systems to monitor power intake, usage, storage, output, etc. Such computer, computer 714 may be hard wired into the vehicle 100, it could be a mobile device used to send and receive and display data, as well as receive and cause display of GUIs representing data. The computing device, computer 714 could be integrated into the vehicle 100, it could be a smartphone, a laptop, tablet computer, server computer, or any other kind of computing device.

Assembly Examples

Referring to FIG. 12, an exploded view of an assemblage of various assemblies and components is shown comprising examples of a chassis 400 having a battery compartment cover 800, a battery pack assembly 850, a plurality of seats 900, a vent and wire harness assembly 950, a steering assembly 1000, a front inner firewall assembly 1050 and a front outer firewall assembly 1100, also included is an example of the fore-aft borders of the cabin 140.

In some examples a battery pack assembly 850 may include at least one battery held in a slidable tray allowing for the battery pack assembly 850 to be secured within the battery compartment part of the chassis. The slidable tray can also provide for the removal of the battery pack.

In some examples a battery compartment cover 800 may provide for enclosing the battery compartment and utility channel and may be attached to the rear end of the chassis 400 using bolts. The four upper bolts of the battery compartment cover 800 may be attached to a right mounting bracket 1252 and a left mounting bracket 1278 that is part of the rear end of a frame assembly 1200 shown in FIG. 13.

In some examples seats 900 may be configured centerline of the chassis 400 that may provide for a tandem seating arrangement and may be configured to include only one seat or a plurality of seats.

In some examples a vent and wire harness assembly 950 may be used for routing electrical wires, cabin ventilation including distributing heat and/or cooling and also for defogging the canopies. The assembly 950 is also shown with mounting bolts on the side which can be used to attach to the interior of the cabin.

In some examples a steering assembly 1000 is shown that may include rack and pinion components and a steering shaft wherein the upper part of the steering shaft passes through a collar attached to the front inner firewall assembly 1050 allowing for attachment of a steering wheel inside the cabin 140. The lower part of the steering shaft may pass through a collar attached to the utility channel 620 and the bottom end of the rack may be attached in a rack and pinion steering housing 438 shown in FIG. 11 that is attached to the bottom end of the battery compartment 600 thereby attaching the steering assembly 1000 to the chassis 400. The steering shaft may attach to a gearbox having a pinion coupled to a rack. The rack may include a tie rod at both ends that may connect to the steering arms of the front wheels. This configuration provides for a steering system for the vehicle 100.

In some examples a front inner firewall assembly 1050 may include a brake pedal and an accelerator pedal including providing a structure for attaching a dash board and instrument cluster. The front inner firewall 1050 may include a fan assembly and vents for providing air circulation to the cabin, including providing structural support to the vehicles 100 body.

In some examples a front outer firewall assembly 1100 may include windshield washing components and headlights, including providing structural support to the vehicles 100 body.

The example arrangement of a chassis 400, including a battery pack assembly 850, and seats 900 contributes to a low center of gravity which may provide for better vehicle handling and stability.

Frame Examples

Figure 13:
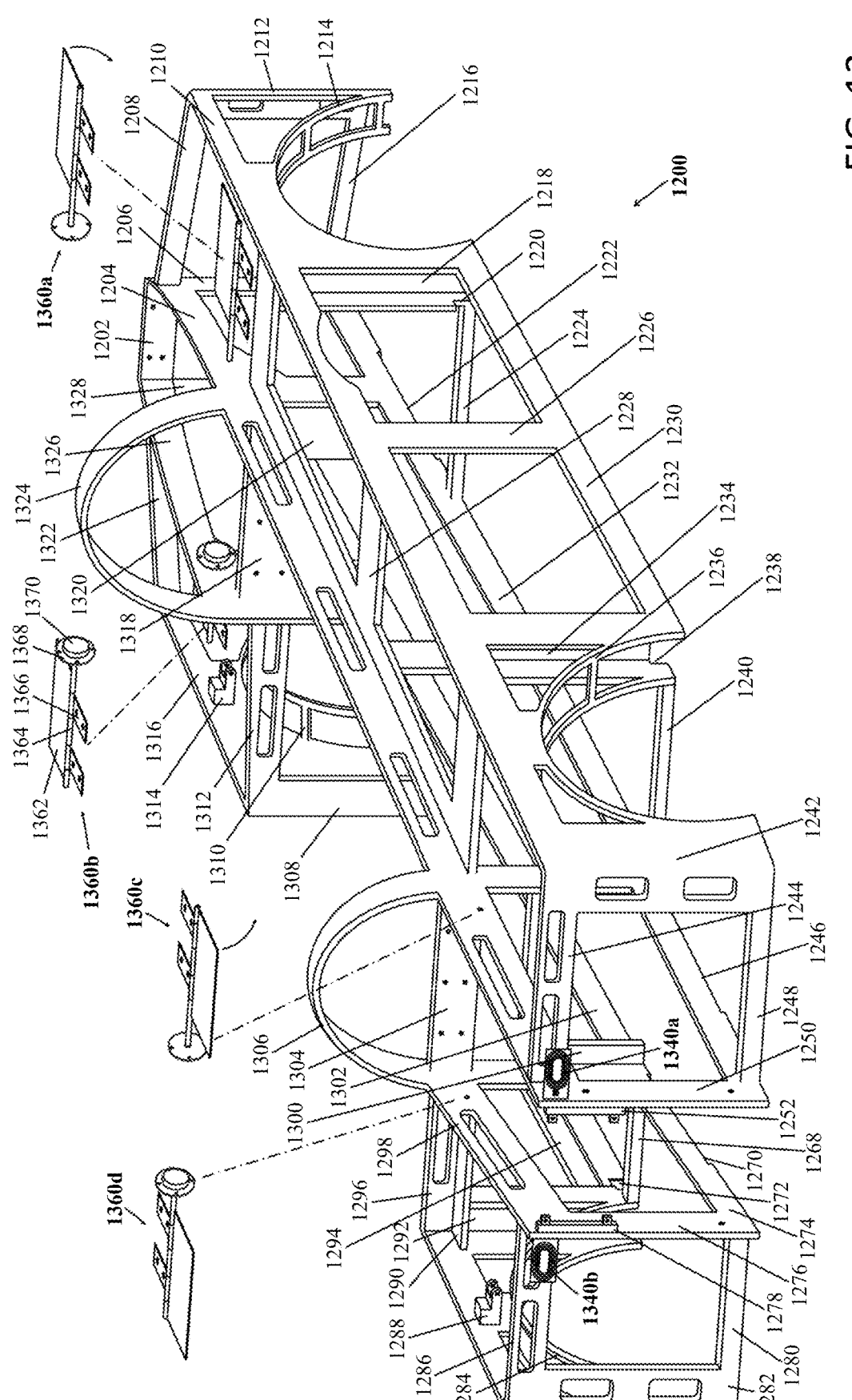
FIG. 13 is an illustration of an example rear perspective view of a frame assembly, according to some embodiments.

Referring to FIG. 13, an example of a frame assembly 1200 is shown that may provide intermediate support for attaching the chassis to the body in addition to providing structural support to the wind and solar generating components and may add structural strength that may provide for protecting the vehicles 100 occupants in the event of a collision. The frame assembly 1200 may include a front end cross member 1202, a right inner upper rail 1204, a right front end vertical cross member 1206, a right front upper cross member 1208, a right upper outer rail 1210, a right front corner vertical member 1212, a right front wheel well structure 1214, a right front lower cross member 1216, a vertical inner cross member 1218, a right front control arm notch 1222, a vertical cross member 1226, a upper right cross members 1228, a vertical inner cross member 1234, a right rear wheel well structure 1236, a right rear corner vertical member 1242, a right rear upper cross member 1244, a right rear control arm notch 1246, a right rear lower cross member 1248, a right rear inner vertical cross member 1250, a right mounting bracket 1252, a left rear control arm notch 1270, a left lower cabin rail 1274, a left rear vertical cross member 1276, a left mounting bracket 1278, a left rear lower cross member 1280, a left rear corner vertical member 1282, a left rear wheel well structure 1284, a left rear upper cross member 1286, a shock absorber mounting bracket 1288, a left rear cross member 1290, a rear vertical door frame member 1292, a left lower rear outer rail 1294, a rear upper door frame member 1296, a left rear upper inner rail 1298, a rear firewall cross member 1304, a rear overhead structure 1306, a front vertical door frame member 1308, a front left wheel well structure 1310, a front upper door frame member 1312, a shock absorber mounting bracket 1314, a left front upper rail 1316, a front inner firewall cross member and mounting bracket 1318, a left front upper cross member 1322, a front overhead structure 1324, a left front upper inner rail 1326, and a left front end vertical cross member 1328.

The frame assembly 1200 may be attached to the chassis 400 by attaching a left rear frame mounting notch 1272, a lower left rear mounting cross member 1268, a left lower rear outer rail 1294, and a left lower cabin rail 1302, attached to the left side of a lower deck support frame 670 shown in FIG. 11 and may include attaching a right rear frame mounting notch 1238, a lower right rear mounting cross member 1240, a right lower cabin rail 1232, a right lower outer rail 1230, a right front frame mounting notch 1220, and a front right lower mounting cross member 1224 may attach to the right side of a lower deck support frame 670 shown in FIG. 11.

The frame assembly 1200 may be centrally attached to the chassis 400 on top of the utility channel 620 and battery compartment 600 and may include a U-shaped rear center chassis mount 1300 that may be attached adjacent to the rear firewall 640 shown in FIG. 11, and a U-shaped front center chassis mount 1320 that may be attached adjacent to the front inner firewall assembly 1050 shown in FIG. 12.

In another example the frame assembly 1200 may include one or more vertical and horizontal frame cutouts and one or more dampers 1360a, 1360b, 1360c, 1360d that may be attached to any location on or in the vehicle 100 for allowing airflow that may provide for cooling the solar panels and components while the vehicle 100 is static or in motion.

In another example one or more vertical or horizontal frame cutouts may be configured with dampers for manipulating the airflow within the vehicle 100.

The airflow may be the result of convection, wind or a combination of convection and wind and may include airflow resulting from one or more fans or blowers that may be attached to any location within the vehicle 100.

In another example the frame assembly 1200 may include dampers 1360a, 1360b, 1360c, 1360d that may be located at the bottom of the left upper deck 108a and right upper deck 108b of the vehicle 100 that may be used to regulate airflow. The dampers 1360a, 1360b, 1360c, 1360d may be attached to the vehicle's 100 frame 1200 and/or body by a motor mounting plate 1368 which is attached to a stepper motor 1370. The stepper motor's 1370 shaft is attached to the part of a knuckle hinge 1364 that is also attached to a flap 1362. This configuration allows a stepper motor 1370 attached to controls to manipulate a flap 1362 while the mounting plates 1366 attached to the other part of the knuckle hinge 1364 may hold the damper in place.

A stepper motor 1370 and controls is only one of various ways to manipulate the flap and may include but not be limited to a bi-metallic coil in place of the stepper motor 1360 attached to a flap 1352 through the knuckle hinge 1354. In another example the motor may be any type of motor including but not limited to a stepper motor that may be manipulated by controls. In another example the motor may be a motor with rotational shaft control. The dampers shown are of only one design however, as any design or any device which may provide airflow into the vehicle 100 at any one or more locations may be used such as but not limited to air scoops and/or air vents.

In another example the dampers may be manipulated into an open or closed position by various means that may include but not be limited to a thermostat, mechanical, non-programmable, programmable, manually set, analog, digital, wireless design, computer or controls in one or in any combination and may be comprised of one or more temperature sensors.

In another example, one or more dampers 1360a, 1360b, 1360c, and 1360d may be configured to be closed, or partially open, or fully open in any combination that may allow for optimizing the air circulation under the solar panels.

In another example dampers may be attached to the cutouts adjacent to the cabin and rear compartment and may be used to manipulate airflow which may allow heated air from the solar panels to circulate into the cabin, or rear compartment.

In another example at least one of the solar panels may be comprised of cooling fins and/or heat sinks that may provide for cooling the solar panels.

Wind Examples, Overview

Figure 14:
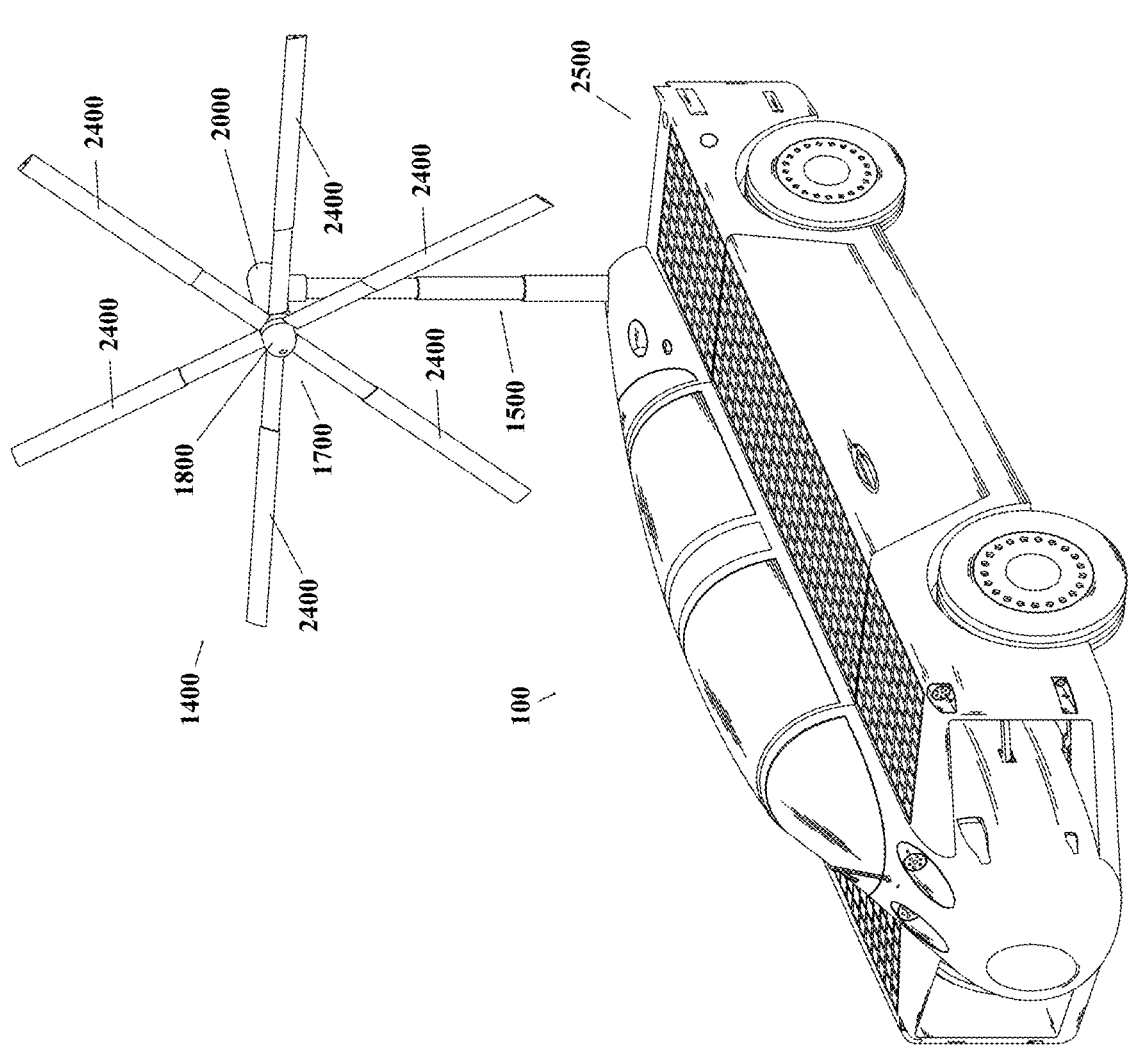
FIG. 14 is an illustration of an example front side perspective view of a vehicle shown with a stowable wind turbine assembly in a deployed position, and a stowable anemometer in a deployed position, according to some embodiments.
Figure 15:
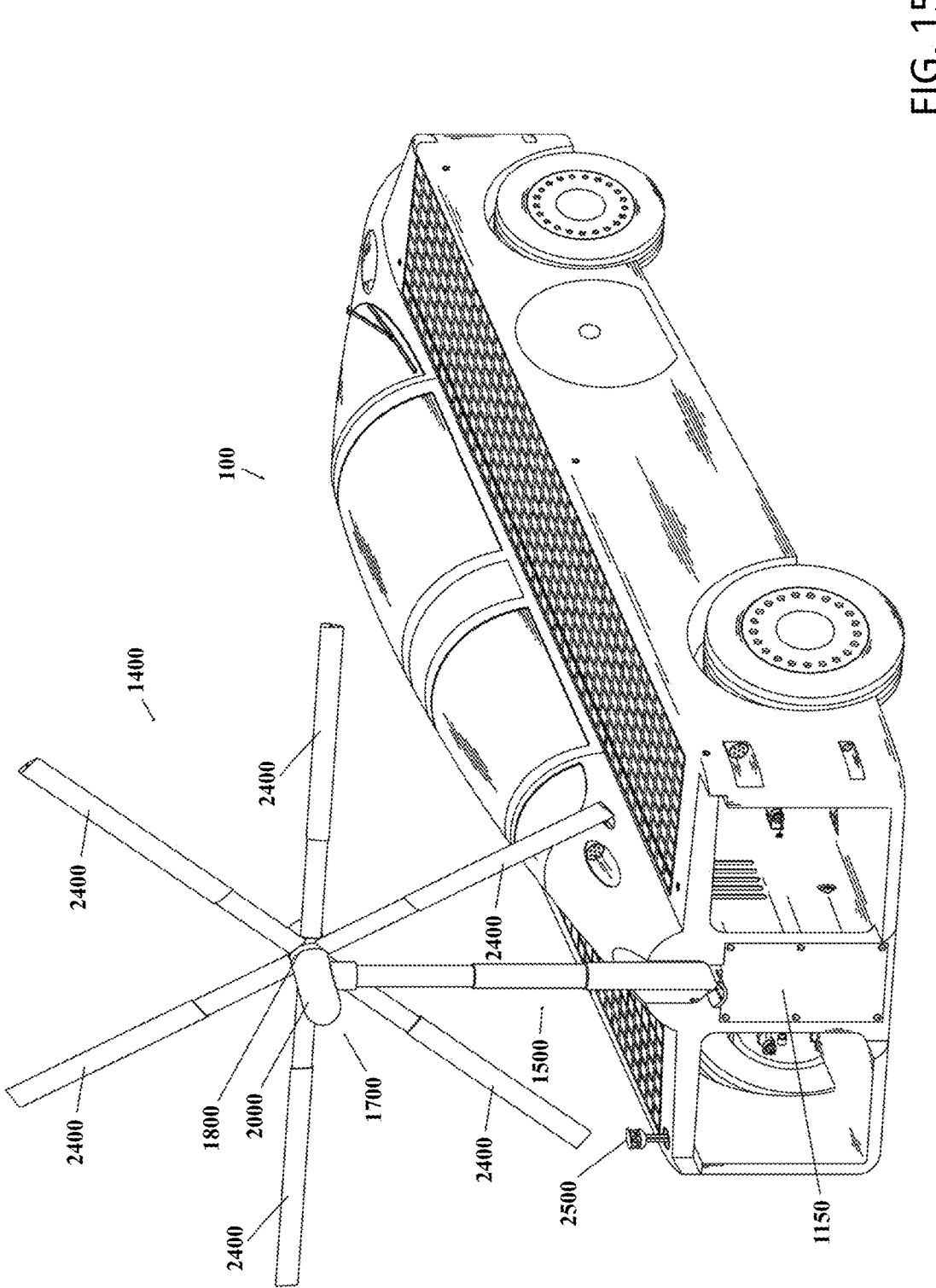
FIG. 15 is an illustration of an example rear side perspective view of a vehicle shown with a stowable wind turbine assembly in a deployed position, and a stowable anemometer in a deployed position, according to some embodiments.

Referring to FIG. 14 and FIG. 15, a vehicle 100 having an example embodiment of a stowable HAWT assembly 1400 is shown in a deployed position comprising a mast assembly 1500 in a deployed position, a horizontal-axis wind turbine assembly 1700 in a deployed position, a rotor hub assembly 1800 in a deployed position, a generator assembly 2000 having outer mounted extendable blades 2400 in a deployed position, a stowable anemometer 2500 is shown in a deployed position and a rear cover and docking cradle 1150 is shown attached.

In other examples the stowable HAWT assembly 1400 may be configured with one or more hubs with each hub having one or more fixed or extendable blades of any type or design.

In another example the stowable HAWT assembly 1400 may be deployed in favorable wind conditions when the vehicle 100 is parked, thereby providing electrical energy for charging the vehicles 100 battery pack. Wind generated electricity may be used to charge another electric vehicle or to supply electrical energy to a house or to the electrical grid or anywhere electrical energy would be desired.

In another example the stowable HAWT assembly 1400 may include wind tracking components comprised of a stepper motor having at least one gear which may manipulate the yaw position of a generator assembly 2000 and may include at least one rotational sensor capable of detecting the yaw position that may provide for positional feedback for rotating the generator assembly 2000 into various yaw positions including a deployed or stowed position. In another example the motor may be any type of motor including but not limited to a stepper motor that may be manipulated by controls. In another example the motor may be a motor with rotational shaft control. The wind generating components of the stowable HAWT assembly 1400 are described in more detail in FIGS. 16-24.

Wind Examples, Mast

Figure 16:
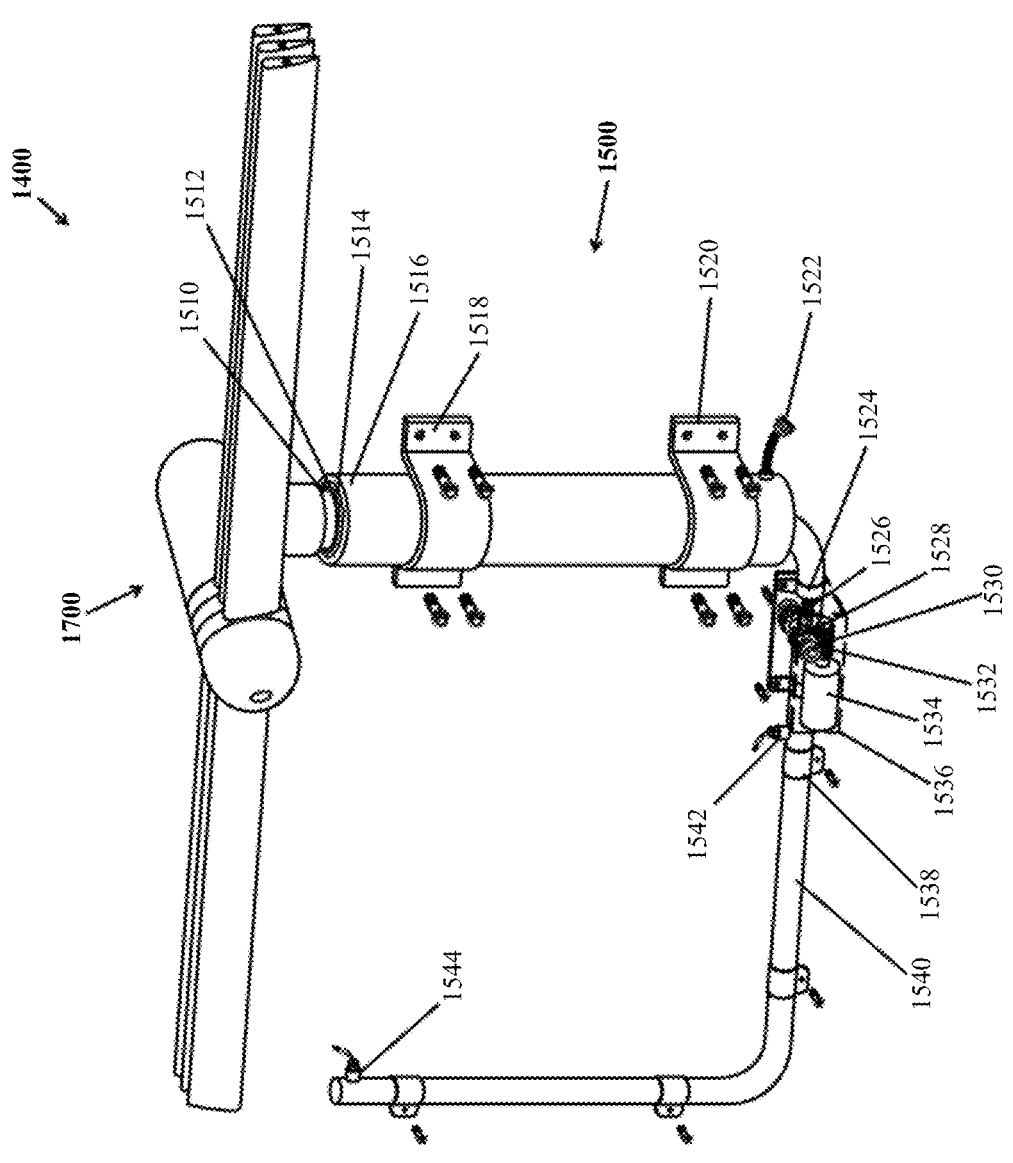
FIG. 16 is an illustration of an example perspective view of a stowable wind turbine assembly shown in a stowed position, according to some embodiments.

Referring to FIG. 16, an example of a stowable HAWT assembly 1400 is shown in a stowed position having a horizontal-axis wind turbine assembly 1700 shown in a stowed position, and a mast assembly 1500 shown in a stowed position. In another example the mast assembly 1500 may include a top mast tube 1510, an upper middle mast tube 1512, a lower middle mast tube 1514 and a bottom mast tube 1516. The tubes may be configured in a slidable arrangement which may allow the mast to extend or retract.

In another example the mast assembly 1500 may include an upper bracket 1518 and a lower bracket 1520 that may be used for mounting the mast assembly 1500 to the battery compartment cover 800 shown in FIG. 12. In another example a housing cradle bracket 1524 may attach a motor and gear cradle 1536 to the vehicle 100.

In another example the motor and gear cradle 1536 may house a mast motor 1534 and a worm and shaft 1532 that may be mated to transfer gears 1528 that may be mounted to a bearing 1530. This configuration allows the vehicles 100 controls to manipulate an inner mast lifter belt 1526 which may extend or retract the mast assembly 1500. The mast motor 1534 may be any type of motor including but not limited to a stepper motor that may be manipulated by controls. In another example the motor may be a motor with rotational shaft control.

In another example the inner mast lifter belt 1526 may include sensing data from a lower proximity sensor 1542 and an upper proximity sensor 1544 which may allow for limiting the extension or retraction of the inner mast lifter belt 1526.

In other examples the mast assembly 1500 may include housing brackets 1538 for attaching the belt housing 1540 to the vehicle 100, and a belt housing 1540 for housing the inner mast lifter belt 1526, and may include at least two proximity sensors, a lower proximity sensor 1542, and an upper proximity sensor 1544 that may be used for detecting the stowed or a deployed position of the mast assembly 1500. The proximity sensors may be used in combination with a motor having at least one gear.

Figure 17:
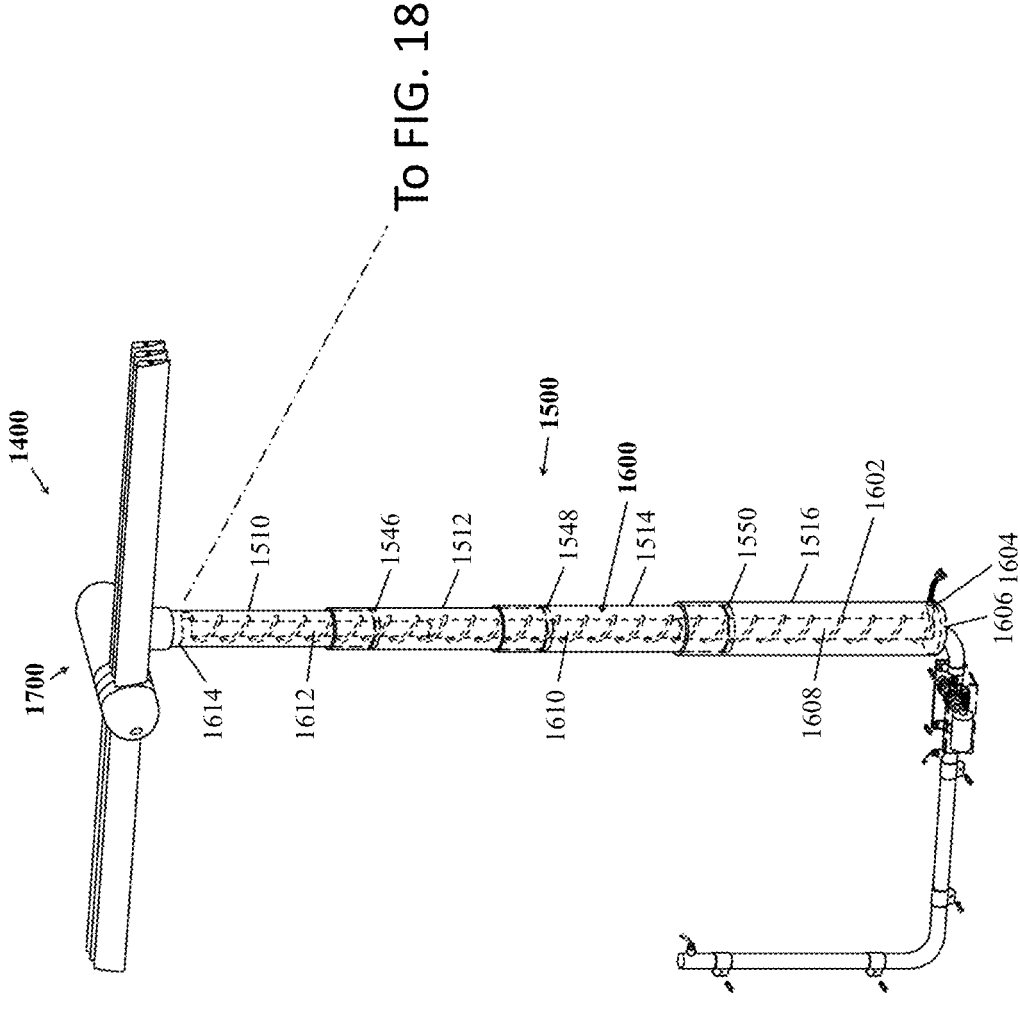
FIG. 17 is an illustration of an example perspective view of a stowable wind turbine assembly shown in a deployed position, according to some embodiments.

Referring to FIG. 17, an example of a stowable HAWT assembly 1400 is shown having a horizontal-axis wind turbine assembly 1700 shown in a stowed position, and a mast assembly 1500 shown in a deployed position having a top mast tube 1510, a upper middle mast tube 1512, a lower middle mast tube 1514 and a bottom mast tube 1516, wherein the tubes are slidably arranged.

In another example a top mast tube stop 1546, an upper middle mast tube stop 1548 and a lower middle mast tube stop 1550 is shown attached to the bottom of the tubes wherein the tube stops allow the tubes to slide within the larger diameter part of the tubes they are nestled in and are stopped from extending when the tube stop slides into the smaller diameter part of the tube it is nestled in. This configuration allows the mast tubes to extend or retract in a slidable arrangement and also may limit the extension of the mast.

In another example the mast tubes may be comprised of a groove and tab arrangement wherein a tab attached to an inner mast tube resides within a groove of an outer mast tube wherein the travel of the tab is limited to the length of the groove thereby allowing the mast tubes to be manipulated to extend or retract in a slidable arrangement and also limits the extension of the tubes. The groove and tab arrangement may include more than one set of grooves and tabs.

In another example an inner mast assembly 1600 is shown in an extended position and attached at the bottom to a bottom stop plate mount 1606 and attached at the top to an upper stop plate mount 1614, and includes an inner mast bottom outer tube 1608, an inner mast middle tube 1610, and an inner mast top inner tube 1612. The tubes may be configured in a slidable arrangement.

In another example a retractable coil cord 1602 is shown that may wrap around the inner mast assembly 1600, and may be attached at the bottom to a lower coil collar 1604. The retractable coil cord 1602 may provide for housing and routing wires when the mast assembly 1500 is extended or retracted and may include a lower wire harness 1522 shown in FIG. 16 for attaching a horizontal-axis wind turbine assembly 1700 to the vehicles 100 power and control systems.

In other examples the mast assembly 1500 may be comprised of at least two outer tubes and at least two inner tubes.

Wind Examples, Inner Mast

Figure 18:
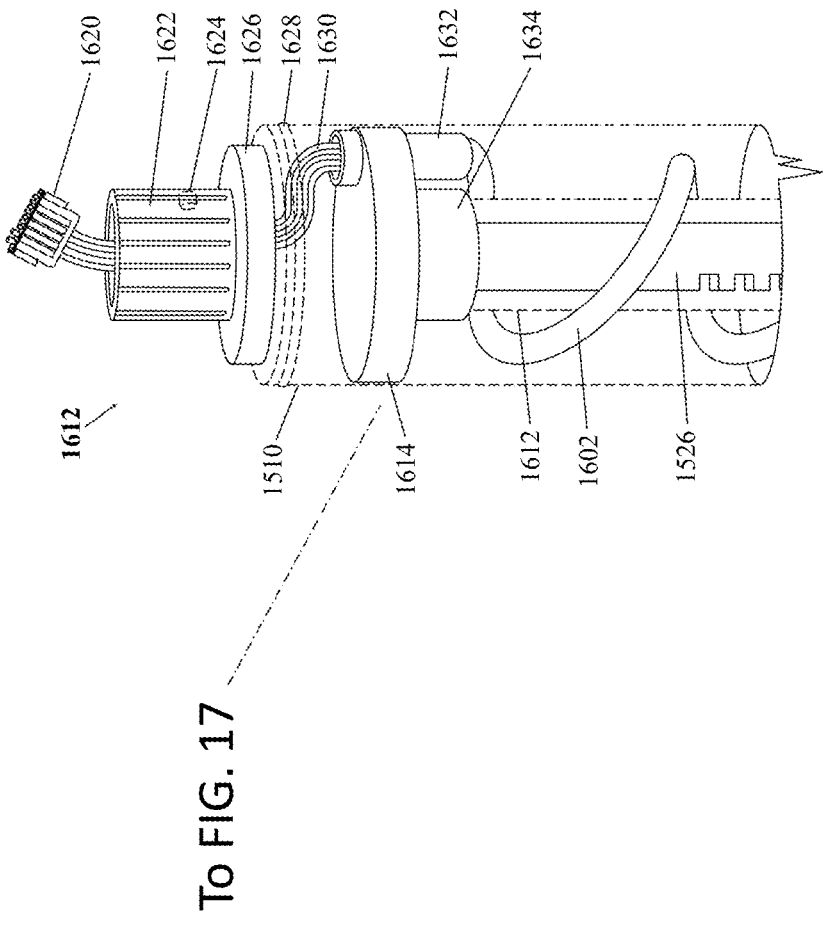
FIG. 18 is an illustration of an example blown-up fractional view of the upper section of an inner mast top inner tube, according to some embodiments.
Figure 20:
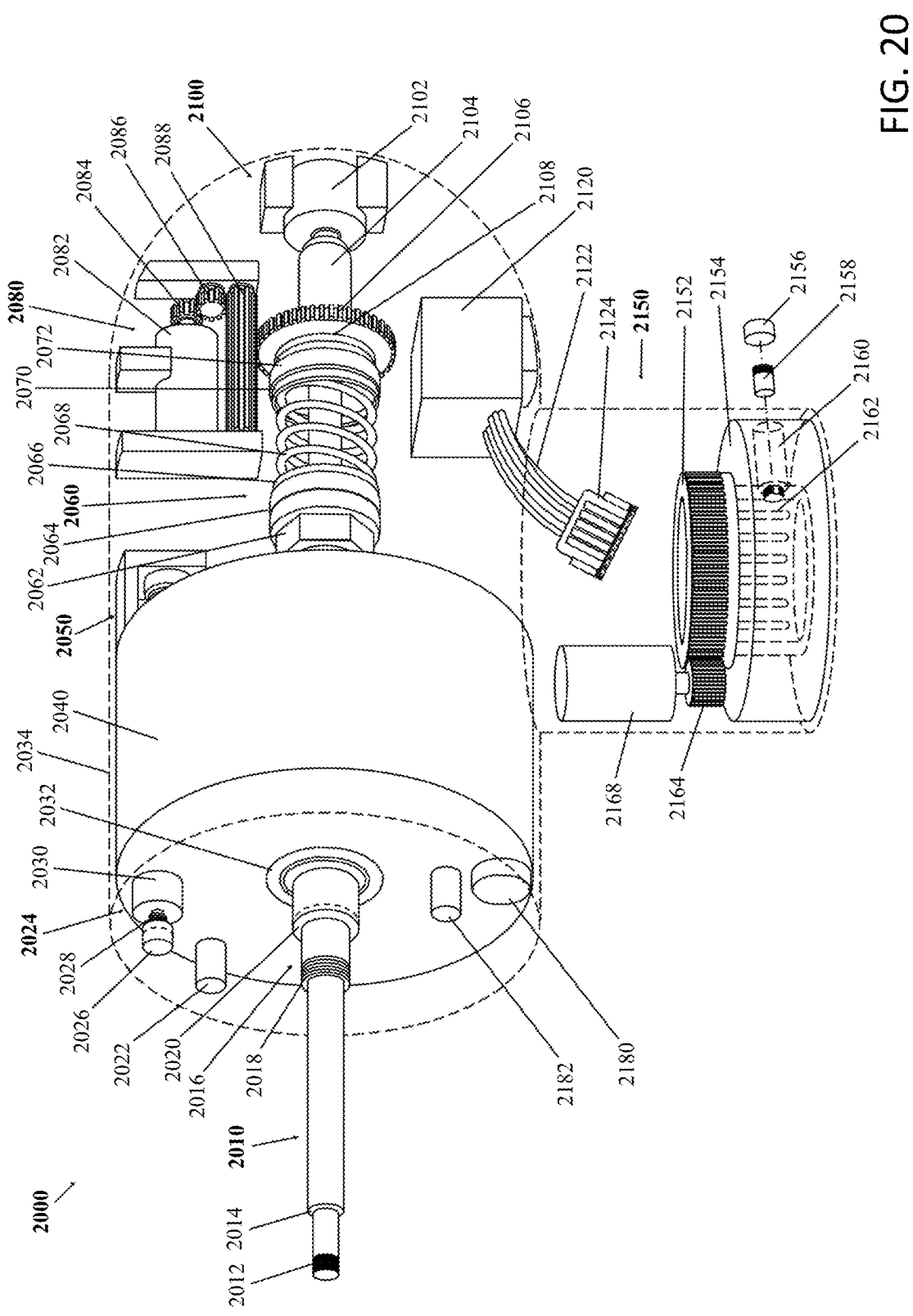
FIG. 20 is an illustration of an example perspective view of a generator assembly shown in a stowed position, according to some embodiments.

Referring to FIG. 18, an example embodiment is shown of a fractional view of an upper section of an inner mast top inner tube 1612 having an upper wire harness connector 1620 that may attach to a wiring harness connector 2124 and a wiring harness 2122 located in the generator assembly 2000 shown in FIG. 20. The connection may provide for the horizontal-axis wind turbine assembly 1700 to connect to and be manipulated by the vehicles 100 power and control systems and also allows for the horizontal-axis wind turbine assembly 1700 to route electrical energy to a charge controller 702 shown in FIG. 11 which may be connected to a battery pack assembly 850 thereby allowing the electrical energy generated by the wind turbine to charge the battery pack.

Figure 21:
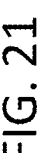
FIG. 21 is an illustration of an example perspective view of a horizontal-axis wind turbine assembly, according to some embodiments.
Figure 22:
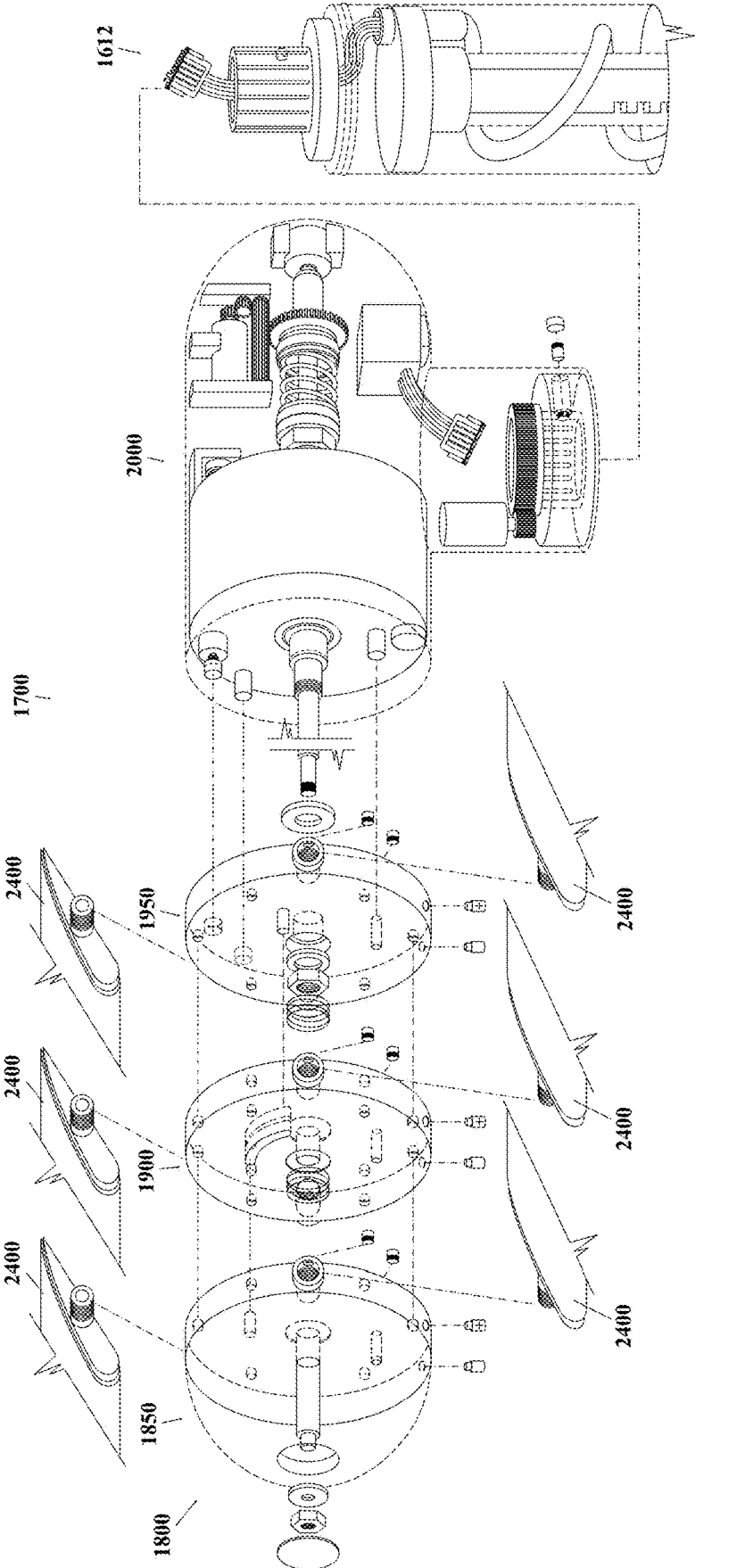
FIG. 22 is an illustration of an example exploded perspective view of an assemblage of a horizontal-axis wind turbine assembly, according to some embodiments.

In another example a fluted mounting post 1622 having a set screw hole 1624 is shown that may be used for attaching the mast to a fluted inner mount 2162 located in the generator assembly 2000 shown in FIGS. 20-22.

In another example a post base 1626 is shown that may provide a base and support to the top tube and an O-ring 1628 that may provide a seal between the generator and the mast.

In another example a wiring harness 1630 is shown routed through an upper coil collar 1632 which allows the retractable coil cord 1602 to be attached to the upper part of the mast assembly 1500.

In another example an upper inner mast mount 1634 is shown attached to an upper stop plate mount 1614 which itself is attached to the upper part of a top mast tube 1510.

In another example the upper inner mast mount 1634 is attached to an inner mast top inner tube 1612 which also houses an inner mast lifter belt 1526.

This configuration allows for an inner mast assembly 1600 to manipulate the mast assembly 1500 into a deployed position or into a stowed position.

Wind Examples, Mast Deployment

In an example of a mast deployment, referring to FIGS. 16-17, controls may manipulate a mast motor 1534 attached to a worm and shaft 1532 that is mated to an inner mast lifter belt 1526 by transfer gears 1528 thereby allowing an inner mast assembly 1600 slidably arranged and attached to a 1614 upper stop plate mount and a 1606 bottom stop plate mount to extend in a telescopic manner within a top mast tube 1510, upper middle mast tube 1512, lower middle mast tube 1514 and a bottom mast tube 1516 which are also slidably arranged to also extend in a telescopic manner. The mast assembly is held in place by the worm and shaft 1532 mated to the transfer gears 1528 thereby securing the inner mast lifter belt 1526. This configuration allows the mast assembly 1500 to raise an attached horizontal-axis wind turbine assembly 1700.

Wind Examples, Mast Stowing

In an example of a mast stowing, referring to FIGS. 16-17, controls may manipulate a mast motor 1534 attached to a worm and shaft 1532 that is mated to an inner mast lifter belt 1526 by transfer gears 1528 thereby allowing an inner mast assembly 1600 slidably arranged and attached to a 1614 upper stop plate mount and a 1606 bottom stop plate mount to retract in a telescopic manner within a top mast tube 1510, upper middle mast tube 1512, lower middle mast tube 1514 and a bottom mast tube 1516 which are also slidably arranged to also retract in a telescopic manner. The mast assembly is held in place by the worm and shaft 1532 mated to the transfer gears 1528 thereby securing the inner mast lifter belt 1526. This configuration allows the mast assembly 1500 to lower an attached horizontal-axis wind turbine assembly 1700.

Wind Examples, Rotor Hubs and Generator, Overview

Figure 19:
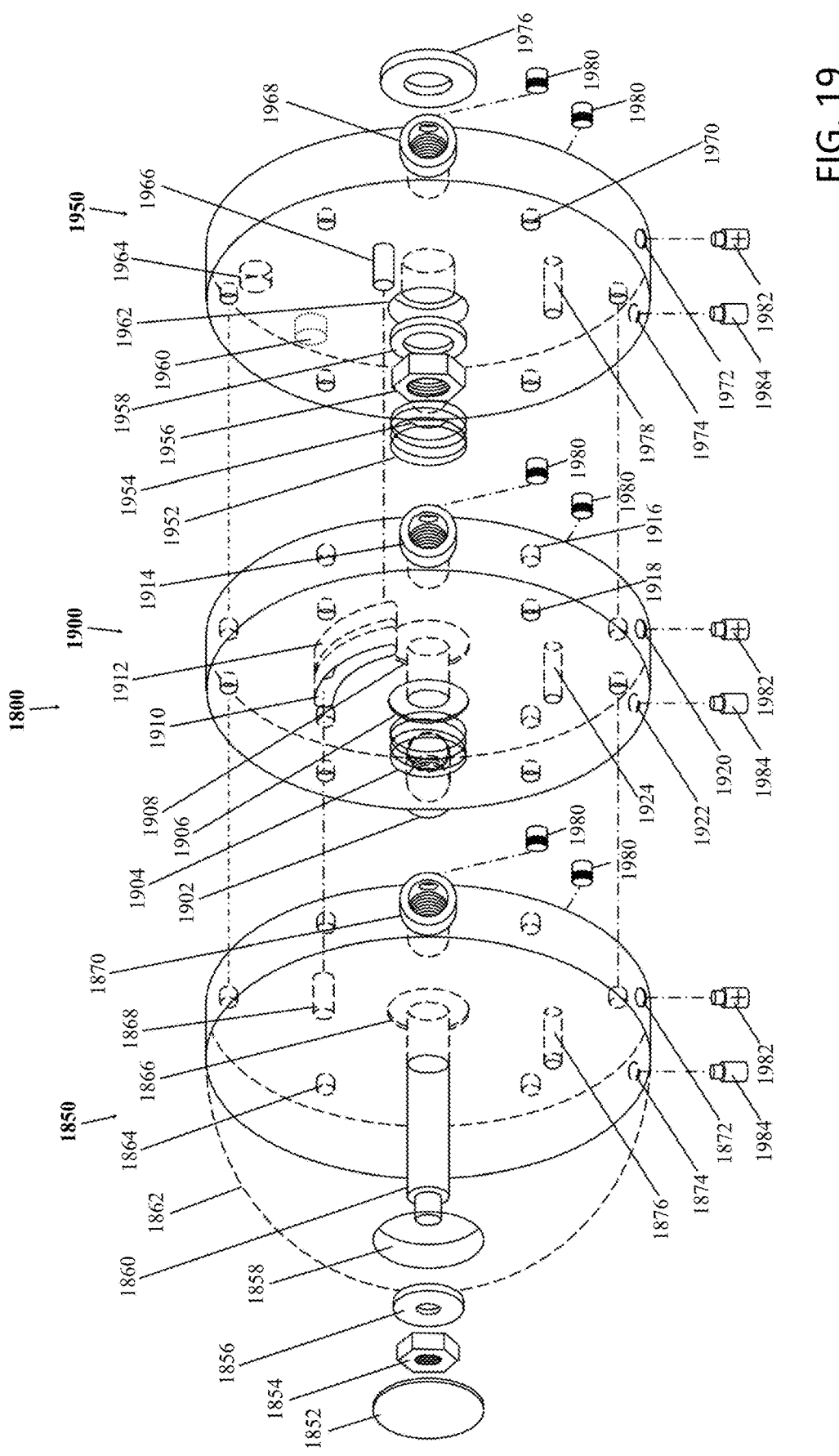
FIG. 19 is an illustration of an example exploded perspective view of a rotor hub assembly, according to some embodiments.

Referring to FIG. 19, an example embodiment of a rotor hub assembly 1800 in an exploded view is shown having a front hub 1850, a middle hub 1900 and a rear hub 1950. Each hub may include a pair of blade mounts that may include a blade mount 1870, a blade mount 1902, a blade mount 1914, a blade mount 1954, and a blade mount 1968. The blade mounts may be used for attaching outer mounted extendable blades 2400 shown in FIGS. 23-24, however any blade design or any modified version of the blade designs shown may be used.

In some examples an inner shaft lock nut 1854 and washer 1856 may be used for attaching a front hub 1850 that may include a cone mount 1860 shown in FIG. 19 to an inner shaft 2010 that may include outer hub mounting threads 2012 and a shaft stop 2014 shown in FIG. 20. The front hub 1850 may include a cap cover 1852 that can be attached into a cone nut recess 1858 thereby providing a seal. A cone 1862 shown in FIG. 19 may provide an aerodynamic cover to the front hub.

In other examples the hubs may include hub lock pins 1864 on the back of a front hub 1850, a plurality of hub pin receptacles 1918 on the front of a middle hub 1900, a plurality of hub lock pins 1916 on the back of a middle hub 1900 and a plurality of hub locking pin receptacles 1970 on the front of a rear hub 1950. The hub lock pins and hub locking pin receptacles provide for locking the hubs, thereby preventing them from rotating when in a stowed or in a deployed position.

In another example the rear hub 1950 shown in FIG. 19 may be attached to an outer shaft 2016 that may include inner hub mounting threads 2018 and a shaft stop 2020 shown in FIG. 20 by using a rear hub lock nut 1956 and a washer 1958. A spacer washer 1976 may provide a base and spacer for attaching the rotor hub assembly 1800 to the generator assembly 2000.

Referring to FIG. 19, the outer mounted extendable blades 2400 may be charged through hub charging receptacles 1872, 1874, 1920, 1922, 1972, and 1974 located on the hubs. The charge may be provided when in contact with three sets of positive charging prongs 1982 and negative charging prongs 1984 located in the rear cover and docking cradle 1150 shown in FIG. 15. The charging prongs may be connected to a power source from within the vehicle 100.

The blade mounts each include a blade mount set screw 1980 that may be used to lock the blade to the hub and may be used to manually change the pitch of the blade. The rotor hub assembly 1800 shown in FIG. 19 may include three hubs and six blades.

In another example the rotor hub assembly 1800 may be configured with two hubs and four blades and may include a rear hub 1950, and a middle hub 1900 with each hub having a pair of outer mounted extendable blades 2400, wherein a rear travel limit cutout 1912 would be increased to a sufficient size in order to provide for more travel which would allow equal spacing between the blades 2400.

In another example the rotor hub assembly 1800 may be configured with only a rear hub 1950 and a pair of outer mounted extendable blades 2400.

In other examples the rotor hub assembly 1800 may be configured with more than three hubs with each hub having two blades.

In other examples the wind turbine blades may be of any type, shape or design, including but not limited to extendable blades, or fixed blades.

Wind Examples, Rotor Hubs and Generator, Stowed

Referring to FIG. 19, an example of a rotor hub assembly 1800 in an exploded view is shown which may be attached to a generator assembly 2000 shown in FIG. 20 by a rear hub 1950 that may be attached to an outer shaft 2016 and a front hub 1850 that may be attached to an inner shaft 2010.

The generator assembly 2000 may include a pair of generator bearings shown in the example as a generator bearing 2032, a generator 2040 and a nacelle 2034 which may provide for covering and housing various generator components. The generator 2040 may be a direct drive generator or may be any other type or design including but not limited to a generator configured with at least one gear and/or gear box.

The rotor hub assembly 1800 in FIG. 19 is configured to allow the hubs 1850, 1900 and 1950 to remain locked and adjacent to each when in a stowed position, and to separate and rotate when being deployed, and to remain locked and adjacent to each other when in a deployed position.

Wind Examples, Rotor Hubs and Generator, Deployment Phases

In an example of a hub separation phase, a power distribution and controller box 2120 located in the generator assembly 2000 may manipulate an inner shaft actuator assembly 2100 shown in FIG. 20 to extend allowing an attached friction disc 2108 and a friction disc attached to a friction disc and spring shoe base 2072 to engage and compress the spring 2068 housed in the inner shaft spring assembly 2060 thereby pushing out an inner shaft 2010 that is slidably nestled within an outer shaft 2016 shown in FIG. 20. The front hub 1850 in FIG. 19 attached to the inner shaft 2010 in FIG. 20 may then be moved away from the rear hub 1950, allowing a hub separation spring 1904 between a front hub 1850 and a middle hub 1900, and a hub separation spring 1952 between the middle hub 1900 and a rear hub 1950 to separate the hubs thereby freeing the hubs for rotation.

The inner shaft actuator assembly 2100 in FIG. 20 may include a motor 2102, a load cap 2104, and an inner shaft drive gear 2106 that is mounted rotatably to the load cap 2104. A rotor hub assembly 1800 shown in FIG. 19 may include a spring recess 1866, and a spring recess 1906 that provides shoes for a hub separation spring 1904 and a spring recess 1908, and a hub lock nut recess 1962 that provides shoes for a hub separation spring 1952.

In an example of a hub rotation phase, an inner shaft rotator assembly 2080 comprised of a motor 2082, a motor gear 2084, a transfer gear 2086, and a drive gear 2088, then rotates the inner shaft 2010 with an attached front hub 1850, thereby rotating the front hub 1850 counterclockwise until an outer hub drive pin 1868 on the back of the front hub 1850 that is seated in the front travel limit cutout 1910 located in the middle hub 1900 engages the middle hub 1900 to also rotate counterclockwise until a stop pin 1966 on the front of the rear hub 1950 seated in the rear travel limit cutout 1912 in the middle hub 1900 stops the rotation. A rear hub lock actuator 2024 remains inserted in a rear hub lock pin recess 1964 which prevents the rear hub 1950 from rotating. The inner shaft actuator assembly 2100 then retracts allowing the spring 2068 to compress the front hub 1850, a middle hub 1900 and a rear hub 1950 together into a deployed position. The rear hub lock actuator 2024 is then retracted which unlocks the rear hub 1950 allowing the rotor hub assembly 1800 to rotate freely. This configuration allows for each hub with their attached blades to be separated and rotated into equally spaced positions.

In an example of a hub contraction phase, a power distribution and controller box 2120 located in the generator assembly 2000 may manipulate an inner shaft actuator assembly 2100 shown in FIG. 20 to retract allowing an attached friction disc 2108 and a friction disc attached to a friction disc and spring shoe base 2072 to disengage and decompress the spring 2068 housed in the inner shaft spring assembly 2060 thereby withdrawing the inner shaft 2010 that is slidably nestled within an outer shaft 2016 shown in FIG. 20. The front hub 1850 in FIG. 19 is attached to the inner shaft 2010 in FIG. 20 and is then moved back towards the rear hub 1950, compressing a hub separation spring 1904 between a front hub 1850 and a middle hub 1900, and compressing a hub separation spring 1952 between the middle hub 1900 and a rear hub 1950, thereby joining all the hubs together. The hubs remain compressed together by a spring 2068 and locked together by each hub having a plurality of hub lock pins shown as 1864 and 1916 wherein the pins are set into a plurality of hub pin receptacles shown as a 1918 hub pin receptacle.

In an example of a hub deployed phase, a rear hub lock actuator 2024 shown in FIG. 20 may then be manipulated by controls to withdraw its load cap 2026 from a rear hub lock pin recess 1964 located in the rear hub 1950 shown in FIG. 19, thereby allowing the rotor hub assembly 1800 attached to an outer shaft 2016 and an inner shaft 2010 to rotate freely.

Referring to FIG. 21, an example embodiment of a horizontal-axis wind turbine assembly 1700 is shown with the hubs separated and rotated.

Wind Examples, Rotor Hubs and Generator, Stowing Phases

In an example of a hub braking and aligning phase, controls may manipulate a brake assembly 2050 shown in FIG. 20 to stop the rotation of a rotor hub assembly 1800 and generator 2000. The brake assembly 2050 may be comprised of a brake caliper that may be attached to a generator 2040, and a brake disc that may be attached to the outer shaft 2016. An inner shaft rotator assembly 2080 shown in FIG. 20 may then be used to rotate a rotor hub assembly 1800 shown in FIG. 19, and may stop the rotation when controls detect when a rear hub position magnet 1960 located in the rear hub 1950 in FIG. 19 is aligned with a rear hub position sensor 2022 shown in FIG. 20. A rear hub lock actuator 2024 shown in FIG. 20 may then be manipulated by controls to insert its load cap 2026 into a rear hub lock pin recess 1964 located in the rear hub 1950 shown in FIG. 19, thereby allowing the rotor hub assembly 1800 attached to an outer shaft 2016 and an inner shaft 2010 to lock, thereby preventing rotation.

The rear hub lock actuator 2024 may include a motor 2030 having a lifting screw 2028 and a load cap 2026 that may be manipulated by controls that allows the load cap 2026 to extend or retract. The motor 2030 may be any type of motor including but not limited to a stepper motor that may be manipulated by controls. In another example the motor may be a motor with rotational shaft control.

The hubs may then be separated in the same manner as described in the hub separation phase of deployment.

The hubs may then be rotated in the same manner as described in the hub rotation phase of deployment, with the exception that the hubs are rotated clockwise.

The hubs may then be contracted in the same manner as described in the hub contraction phase of deployment.

In another example the deployment phases and stowing phases may be performed in any order that allows for the wind generator and/or hub(s) to be in a deployed position or to be in a stowed position.

Wind Examples, Rotor Hubs and Generator, Other Examples

The inner shaft spring assembly 2060 shown in FIG. 20 may include an outer shaft spring shoe nut 2062 for attaching to the outer shaft 2016, a slip bearing 2064 for allowing the inner shaft 2010 to rotate, a spring shoe 2066 and a spring shoe 2070 for holding the spring 2068 in place, and a friction disc attached to a friction disc and spring shoe base 2072 which engages a friction disc 2108 and allows the inner shaft 2010 to be rotated. The friction discs may be comprised of any type of surface, material or design that allows the two surfaces to engage with each other thereby allowing the inner shaft 2010 to be manipulated by an inner shaft actuator assembly 2100 and an inner shaft rotator assembly 2080.

In other examples a hub alignment proximity sensor 2182 may be used to detect when the hubs are aligned with the generator.

In another example the motor 2082, and the motor 2102 shown in FIG. 20 may be any type of motor including but not limited to a stepper motor that may be manipulated by controls. In another example the motor may be a motor with rotational shaft control. In another example the power distribution and controller box 2120 located in the generator assembly shown in FIG. 20 may be used to manipulate other various components inside the generator assembly 2000.

In another example hub position sensing data may be provided by at least one hub proximity sensor 2182 shown in FIG. 20 that may be capable of sensing the target disc in the hub alignment hole and target disc 1876, by sensing through a hub alignment hole 1924, and through a hub alignment hole 1978 shown in FIG. 19.

In another example an additional hub alignment hole and target plate such as the hub alignment hole and target disc 1876 shown in FIG. 19 may be added to the front hub 1850 and an additional hub alignment hole such as the hub alignment hole 1924 shown may be added to the middle hub 1900 which may allow the hub alignment proximity sensor 2182 shown in FIG. 20 to sense the rotational position of the hubs which may then stop the rotation of the hubs when the hubs are in a deployed position. The proximity sensor 2182 may include any type of sensor capable of sensing the target disc 1876 including but not limited to a light or laser device that may be reflected from the target disc back to the sensor.

Wind Examples, Assemblage

Referring to FIG. 22, an exploded view of an assemblage of various assemblies and components is shown comprising examples of a horizontal-axis wind turbine assembly 1700 having a rotor hub assembly 1800, a front hub 1850, a middle hub 1900, a rear hub 1950, a generator assembly 2000, and an outer mounted extendable blade 2400, including an inner mast top inner tube 1612.

Wind Examples, Tracking

Referring to FIGS. 20-22, a yaw drive housing 2150 is shown comprising yaw control and components and may include a yaw drive bearing inner race 2152 which is seated rotatably inside a yaw drive bearing outer race 2154, which having a fluted inner mount 2162, may be mounted to an inner mast top inner tube 1612 shown in FIG. 22. A post set screw 2158 may be used to lock the yaw drive bearing inner race 2152 to the inner mast top inner tube 1612 and may be accessed by a set screw hollow 2160 that may be sealed by a seal plug 2156. This configuration allows attaching a generator assembly 2000 of the horizontal-axis wind turbine assembly 1700 to an inner mast top inner tube 1612 of a mast assembly 1500 while also allowing the generator assembly 2000 to be manipulated by the yaw motor 2168.

The yaw drive bearing inner race 2152 may be manipulated by a yaw motor 2168 having a yaw motor gear 2164 whereby the yaw motor gear 2164 is mated to the gear of the yaw drive bearing inner race 2152. The yaw motor 2168 may be a motor with at least one rotary position sensor. In another example the yaw motor 2168 may be any type of motor including but not limited to a stepper motor that may be manipulated by controls. In another example the motor may be a motor with rotational shaft control.

In another example the yaw motor 2168 may be connected to and manipulated by controls which may include wind tracking data from a stowable anemometer 2500 thereby allowing the horizontal-axis wind turbine assembly 1700 to track the wind. The yaw drive housing 2150 may include at least one position sensor that may measure rotational angles thereby providing the generator assembly 2000 with wind tracking capability and that also may be capable of detecting the stowed position. This configuration allows controls to manipulate the yaw rotation of a horizontal-axis wind turbine assembly 1700 into various yaw positions.

Wind Examples, Extending Blades, Overview

Figure 23:
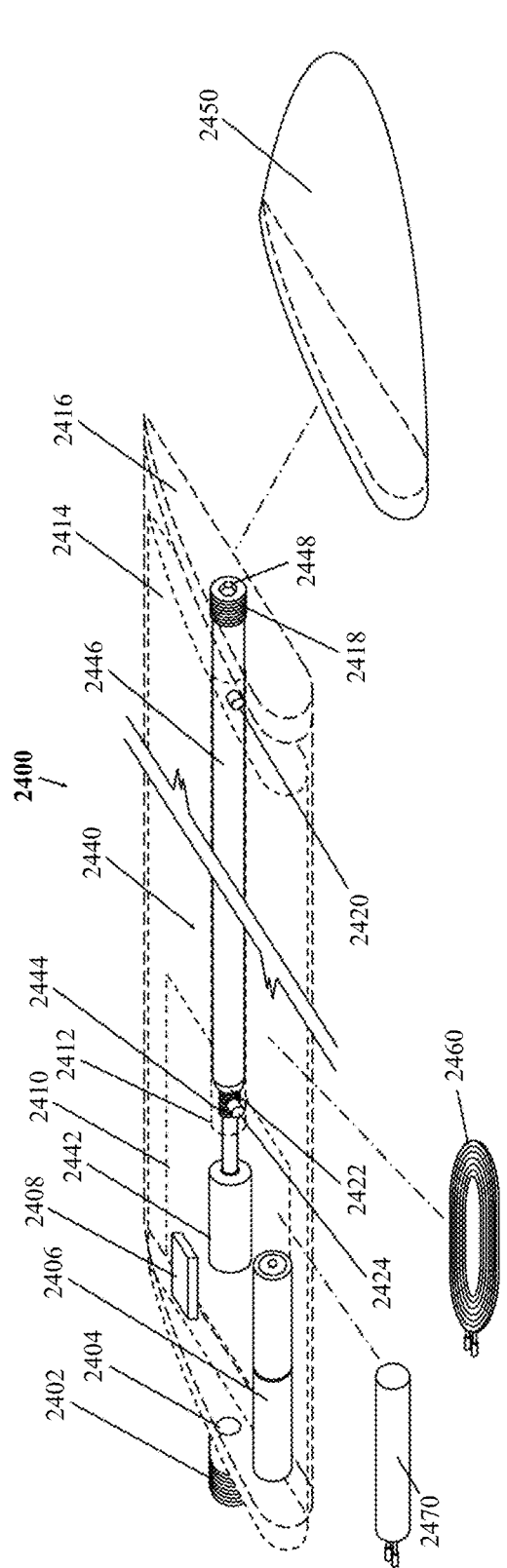
FIG. 23 is an illustration of an example fragmentary perspective view of an outer mounted extendable blade, according to some embodiments.
Figure 24:
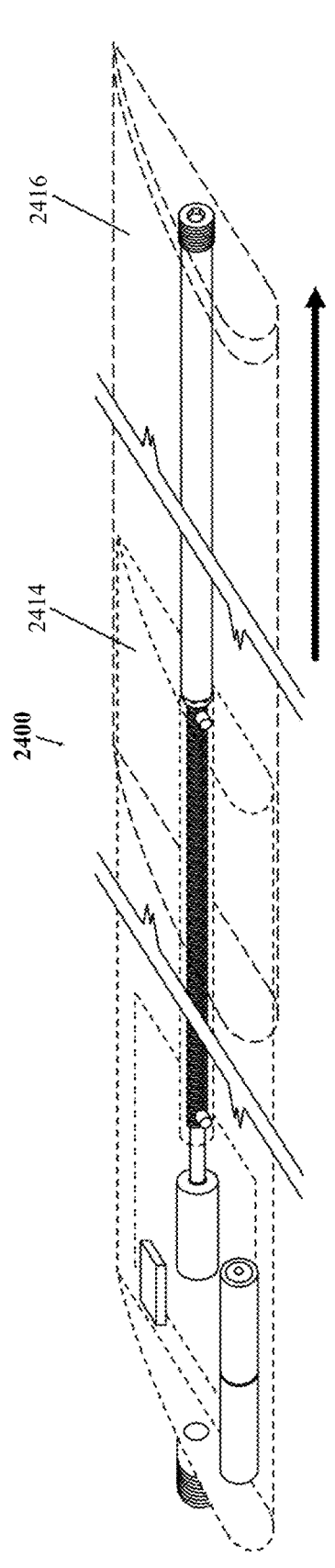
FIG. 24 is an illustration of an example fragmentary perspective view of an outer mounted extendable blade shown in a deployed position, according to some embodiments.

Referring to FIGS. 23-24, an example embodiment of an outer mounted extendable blade 2400 is shown that may include an outer blade 2416 mounted slidably over an inner blade 2414 wherein the inner blade 2414 is attached to a hub and the outer blade 2416 may be attached to an outer tube 2446 configured to extend or retract. This configuration allows an outer mounted extendable blade 2400 to extend or retract in a telescopic manner.

An outer mounted extendable blade 2400 may include a blade mounting stud 2402 that may be used for attaching to blade mounts 1870, 1902, 1914, 1954, and 1968 shown in FIG. 19 and may be attached to hubs 1850, 1900 and 1950 as shown in FIG. 22. A stud hole 2404 shown in FIG. 23 may be used to keep a battery pack 2406 charged by routing electrical wires from the battery pack 2406 to hub charging receptacles 1872, 1874, 1920, 1922, 1972, and 1974 shown in FIG. 19.

In another example a battery pack 2406 may be charged by wireless charging which may include but not be limited to inductive charging whereby two induction coils in proximity combine to transfer electrical energy. A pair of induction transmitter coils 1340*a*, 1340*b* shown in FIG. 13 may be mounted within or on the vehicle 100 anywhere in proximity to the induction receiver coil(s) 2460 shown in FIG. 23 and may include a power source, a controller, a communication module, an AC to DC or DC to DC converter, and a power stage driver.

An example of an induction receiver coil 2460 shown in FIG. 23 may include a battery pack, a controller, communication module, a rectifier, voltage conditioner, device load, and may be mounted within or on each extendable blade 2400. In other examples the wireless transmitting and/or receiving devices may include other components including but not limited to a rectifier, oscillator and a resonant circuit.

In another example the battery pack 2406 may be charged by a motion generator 2470 shown in FIG. 23 that may be mounted within each extendable blade 2400 thereby charging the battery pack as the wind generator's hub(s) rotate. The motion generator may be a linear induction type and may be comprised of a magnet held between two springs that can move up and down and may include controls. In another example the motion generator 2470 may be comprised of a slider and a stator and may include controls. In another example the motion generator 2470 may be situated in a hub(s) and may include one or more motion generators that may provide for charging the battery pack 2406.

In other examples the battery pack 2406 may be charged by any combination of motion generator(s), wireless or charging receptacle(s) means.

The blade extending actuator 2440 may be further comprised of a motor 2442. The motor may be a motor with at least one gear or may be a stepper motor with at least one gear that may be attached to and manipulated by controls which may allow for the full or partial extension or full or partial retraction of an outer mounted extendable blade 2400. The motor 2442 may be attached to a threaded rod

2444 mounted in a traveling nut 2422 which when the motor rotates causes the outer tube 2446 to extend or retract. The blade extending actuator 2440 may include at least one proximity sensor 2420 which may be used to detect the full extension of the actuator, and at least one proximity sensor 2424 which may be used to detect the full retraction of the actuator thereby stopping the actuator from over extending or over retracting. In another example the motor 2442 may be any type of motor including but not limited to a stepper motor that may be manipulated by controls. In another example the motor may be a motor with rotational shaft control.

The extendable blade 2400 may include a maintenance access panel 2410 for accessing various components inside the extendable blade 2400. The movable outer blade 2416 may be attached to a blade tip 2450 which may be any shape or size and may contribute to the aerodynamics of the blade. In other examples the blade 2400 may be partially or wholly twisted in any section of the blade 2400. In another example the blade 2400 may have a tapered shape.

In other examples one or more blade stiffeners may be used separately or in combination that may aid in stiffening the blade 2400 when in an extended position. The blade stiffeners may be of any shape or size including but not limited to a blade sleeve arraigned slidably between the outer and inner blades having tabs that would limit its travel. In another example, the stiffeners may be slidably arranged tubes and may be positioned adjacent to the blade extending actuator 2440.

In other examples the blade 2400 shown in FIG. 23-24 may also be attached to the hubs 1850, 1900, and 1950 shown in FIG. 19 using more than one blade stud, or any other attachment of any design or any type that allows for the blades to be mounted securely to the hubs.

In other examples the blades and hubs may also be configured to include fixed pitch blades, or may include a configuration where the pitch of the blades may be manually altered or may be manipulated with controls. In another example the blades may also be configured as part of the hub wherein the hub and blade are one piece.

Wind Examples, Extending Blades, Deployment

In a blade deployment phase example, controls may manipulate a power distribution and controller box 2120 to send a wireless signal from a transmitter 2180 in FIG. 20 to a wireless control box 2408 in FIG. 23, which may manipulate a blade extending actuator 2440 to partially or fully extend an outer tube 2446 attached to an outer blade 2416. The outer tube 2446 may be nestled slidably in the actuator borehole 2412 of the inner blade section 2414, having a threaded tube stud 2448 that is attached to the internal mounting threads 2418 in the upper part of a movable outer blade 2416. This configuration allows the outer mounted extendable blades 2400 to deploy into a partially or fully extended position when a mast assembly 1500 is in a deployed position.

Wind Examples, Extending Blades, Stowing

In a stowing phase example, controls may manipulate a power distribution and controller box 2120 to send a wireless signal from a transmitter 2180 in FIG. 20 to a wireless control box 2408 in FIG. 23, which may manipulate a blade extending actuator 2440 to retract an outer tube 2446 attached to an outer blade 2416. This configuration allows the outer mounted extendable blades 2400 to retract into a stowable position.

Wind Examples, Stowable HAWT Assembly, Deployment

Figure 25:
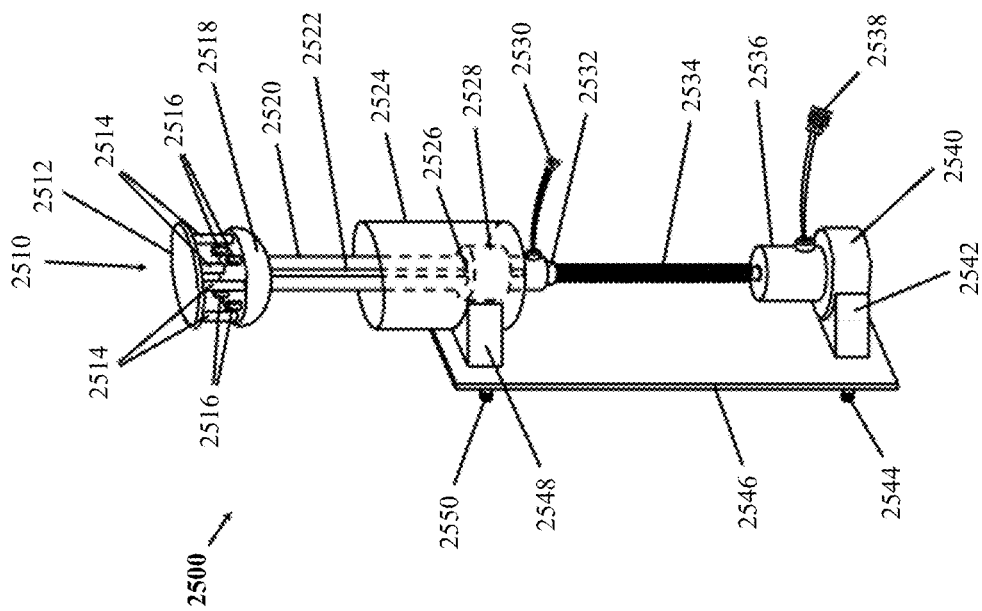
FIG. 25 is an illustration of an example perspective view of a stowable anemometer shown in a deployed position, according to some embodiments.
Figure 26:
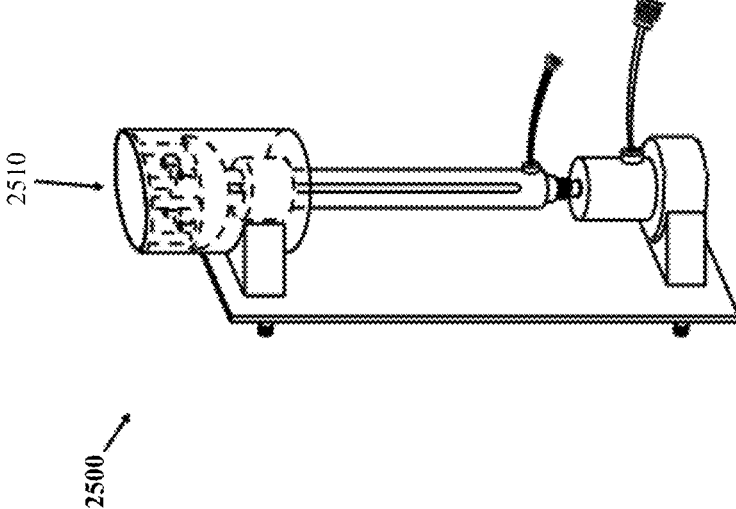
FIG. 26 is an illustration of an example perspective view of a stowable anemometer shown in a stowed position, according to some embodiments.

In a deployment example of a stowable HAWT assembly 1400, a stowable anemometer 2500 shown in FIGS. 25-26, may provide feedback to controls which in favorable wind conditions may manipulate a mast assembly 1500 shown in FIGS. 16-17 to extend into a deployed position, controls may then initiate the deployment of a horizontal-axis wind turbine assembly 1700 shown in FIG. 21 by having components from the generator assembly 2000 and the rotor hub assembly 1800 interact in separating the hubs and rotating the hubs into a deployed position, controls may then activate the extension of outer mounted extendable blades 2400 shown in FIGS. 23-24 into a deployed position, a stowable anemometer 2500 shown in FIGS. 25-26 may provide feedback to controls which may then activate wind tracking components in the generator assembly 2000 to track the wind. This configuration provides a system that allows the stowable HAWT assembly 1400 to be in a deployed position when wind conditions are favorable.

Wind Examples, Stowable HAWT Assembly, Stowing

In a stowing example of a stowable HAWT assembly 1400, a stowable anemometer 2500 shown in FIGS. 25-26 may provide feedback to controls which in unfavorable wind conditions may then activate wind tracking components in the generator assembly 2000 to align the generator assembly 2000 into a stowable position, controls may then activate the retraction of outer mounted extendable blades 2400 shown in FIGS. 23-24 into a stowed position, controls may then initiate the deployment of a horizontal-axis wind turbine assembly 1700 shown in FIG. 21 by having components from the generator assembly 2000 and the rotor hub assembly 1800 interact in separating the hubs and rotating the hubs into a stowed position, controls may then manipulate a mast assembly 1500 shown in FIGS. 16-17 to retract into a deployed position. This configuration provides a system that allows the stowable HAWT assembly 1400 to be in a stowed position when wind conditions are no longer favorable.

Wind Examples, Adjustable Blade Pitch Hub

Figure 34:
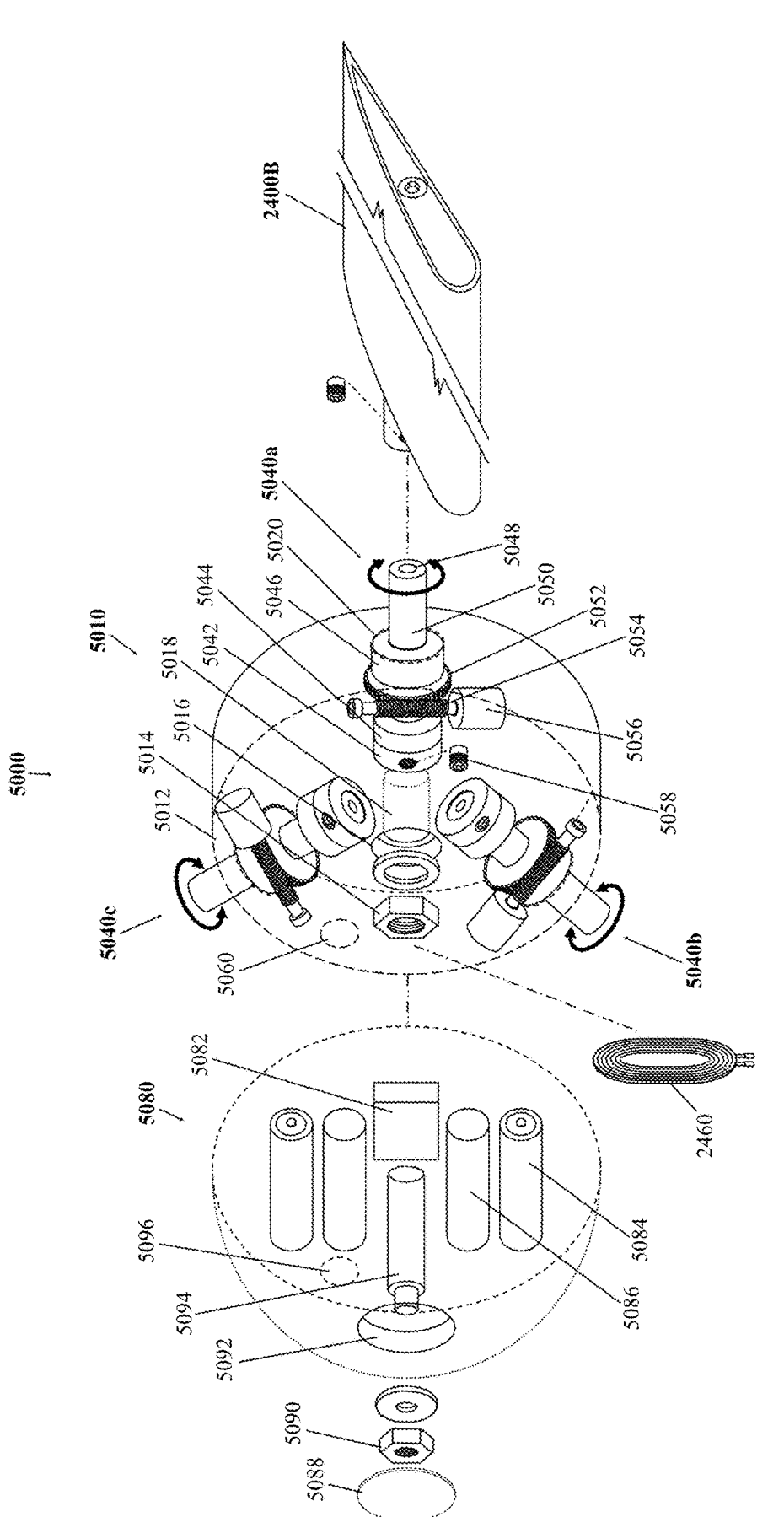
FIG. 34 is an illustration of an example exploded perspective view of a three blade rotor hub assembly, according to some embodiments.

Referring to FIG. 34, an example embodiment of an adjustable blade pitch rotor hub assembly 5000 in an exploded view is shown having a rotor hub assembly 5010, a hub nose cone 5080, and an example of an inner mounted extendable blade 2400B partially shown having an outer blade which may be attached to a hub, and an inner blade mounted slidably inside the outer blade. The adjustable blade pitch rotor hub assembly 5000 may be configured to attach to a generator assembly 2000 shown in FIG. 20 and a mast assembly 1500 shown in FIGS. 16-17. The adjustable blade pitch rotor hub assembly 5000 may be configured with a taller mast assembly 1500.

In another example the adjustable blade pitch rotor hub assembly 5000 may be comprised of two rotor hub assemblies 5010 with at least 6 blades, or, three rotor hub assemblies 5010 with at least nine blades and may include hub components as shown in FIG. 19 which may allow the rotor hub assembly(s) to rotate into a deployed position or allow the rotor hub assembly(s) to rotate into a stowable position.

The rotor hub assembly 5010 may include a hub casing 5012, a hub lock nut 5014, a hub lock recess 5016, a hub collar 5018, a pitch assembly hub cutout 5020, a top position pitch assembly 5040a, and two lower pitch assemblies 5040b, 5040c.

In another example the hub casing 5012 shown in FIG. 34 may include a rear hub position magnet 1960 shown in FIG. 20 for providing hub position data for allowing the hub to be aligned for stowing and a 1964 rear hub lock pin recess for allowing the hub(s) to lock, thereby preventing rotation.

The pitch assemblies 5040a, 5040b, and 5040c may each be further comprised of a stop collar 5042, an inner bearing 5044, an outer bearing 5046, a wire hole 5048, a shaft 5050, a main gear 5052, a worm drive gear 5054, a motor 5056, a set screw 5058, and a wire access cutout 5060.

The motor 5056 may be manipulated by controls to turn clockwise or counter clockwise thereby rotating the worm drive gear 5054 which is mated to a main gear 5052 which is attached to a shaft 5050. The shaft 5050 may be held in place by an outer bearing 5046 and an inner bearing 5044 and may include a stop collar 5042 with a set screw 5058. The pitch assemblies 5040a, 5040b, and 5040c are configured to allow attachment of inner mounted extendable blades 2400B, however any blade design or any modified version of the blade designs shown may be used including outer mounted extendable blades 2400 shown in FIGS. 23-24. Controls attached to the pitch assemblies 5040a, 5040b, and 5040c may provide for manipulating the angle of attack of each individual blade into a pitch angle favorable for generating wind energy or to a pitch angle favorable for stowage. The motor 5056 may be any type of motor including but not limited to a stepper motor that may be manipulated by controls. In another example the motor may be a motor with rotational shaft control which allows for manipulating the blade pitch angle.

The hub nose cone 5080 shown in FIG. 34 may include a control box 5082, a battery pack 5084, a motion generator 5086, a cap 5088, a nose nut 5090, a nut recess 5092, a shaft collar 5094, and a wire access cutout 5096. In another example a battery pack 5084 may be charged by any combination of motion generator(s) 5086, wireless induction receiver coil(s) 2460 or by contact means which may use hub charging receptacles and charging prongs shown in FIG. 19.

The inner mounted extendable blades 2400B may include the same components as the outer mounted extendable blades 2400 shown in FIGS. 23-24, and may be configured in a slidable arrangement wherein the inner blade may extend and retract and the outer blade may be attached to the hub.

Figure 35:
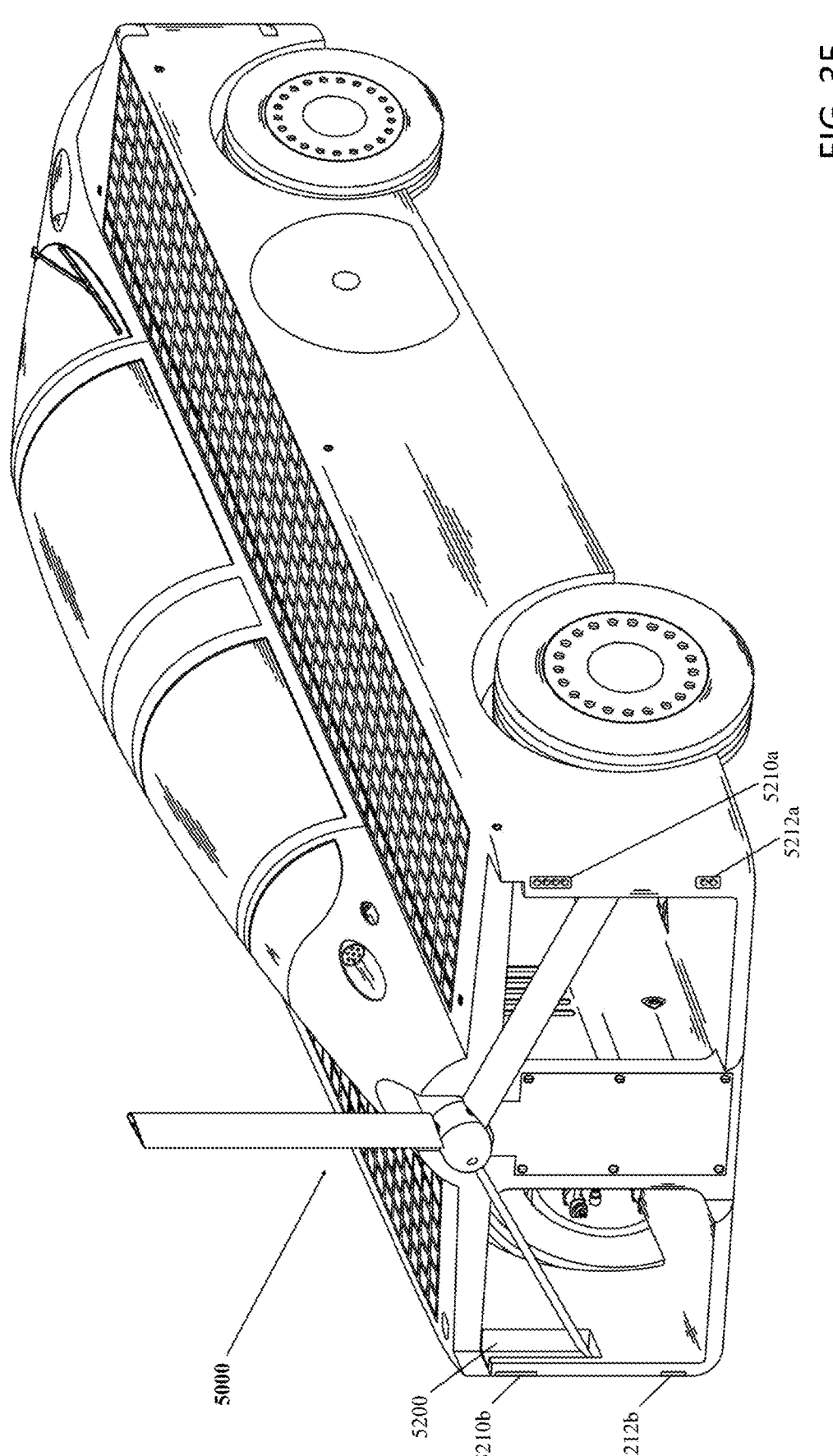
FIG. 35 is an illustration of an alternate example embodiment rear side perspective view of a vehicle shown with a three blade wind turbine assembly in a stowed position, according to some embodiments.
Figure 36:
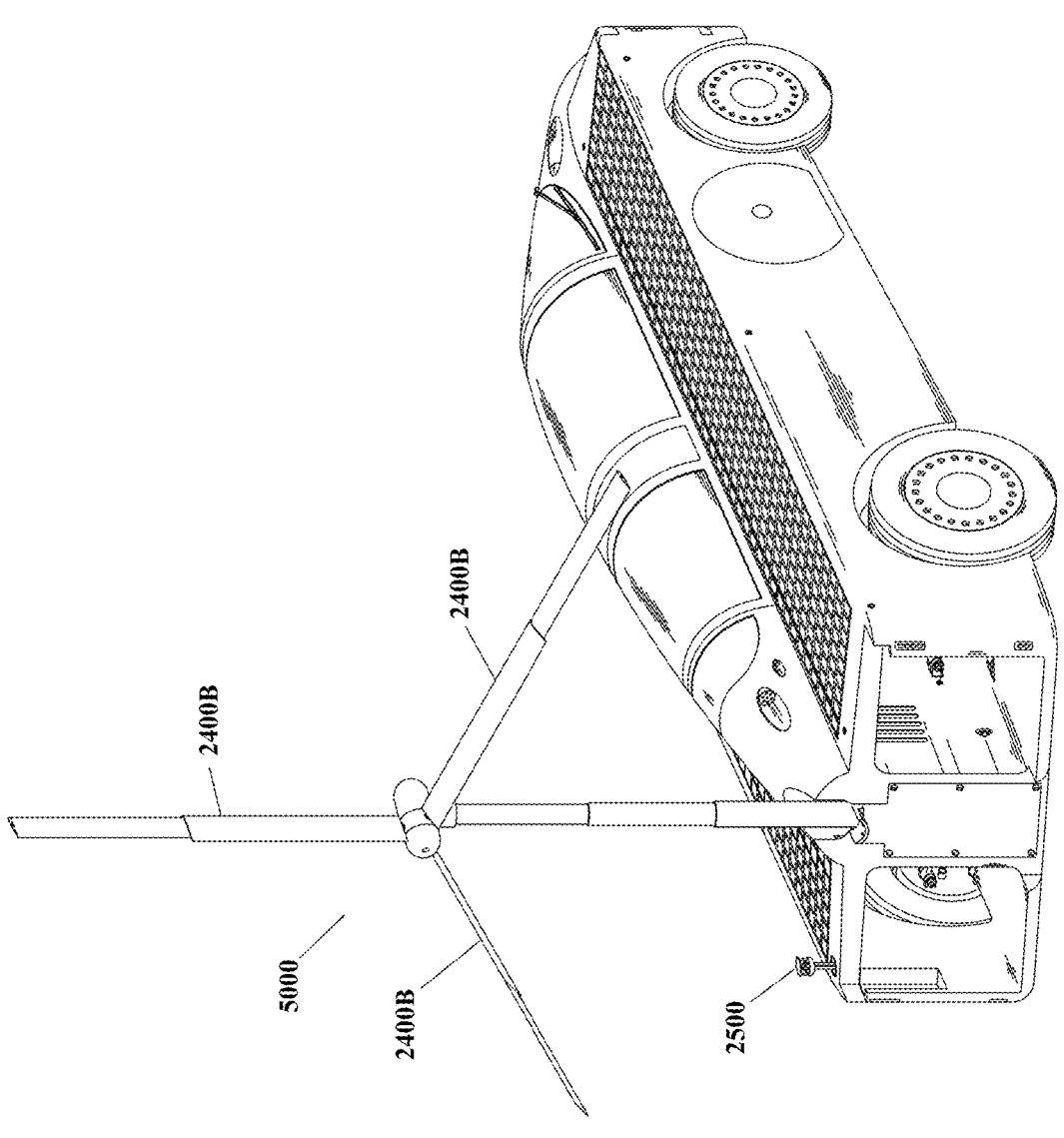
FIG. 36 is an illustration of an alternate example embodiment rear side perspective view of a vehicle shown with a three blade wind turbine assembly in a deployed position, according to some embodiments.
Figure 37:
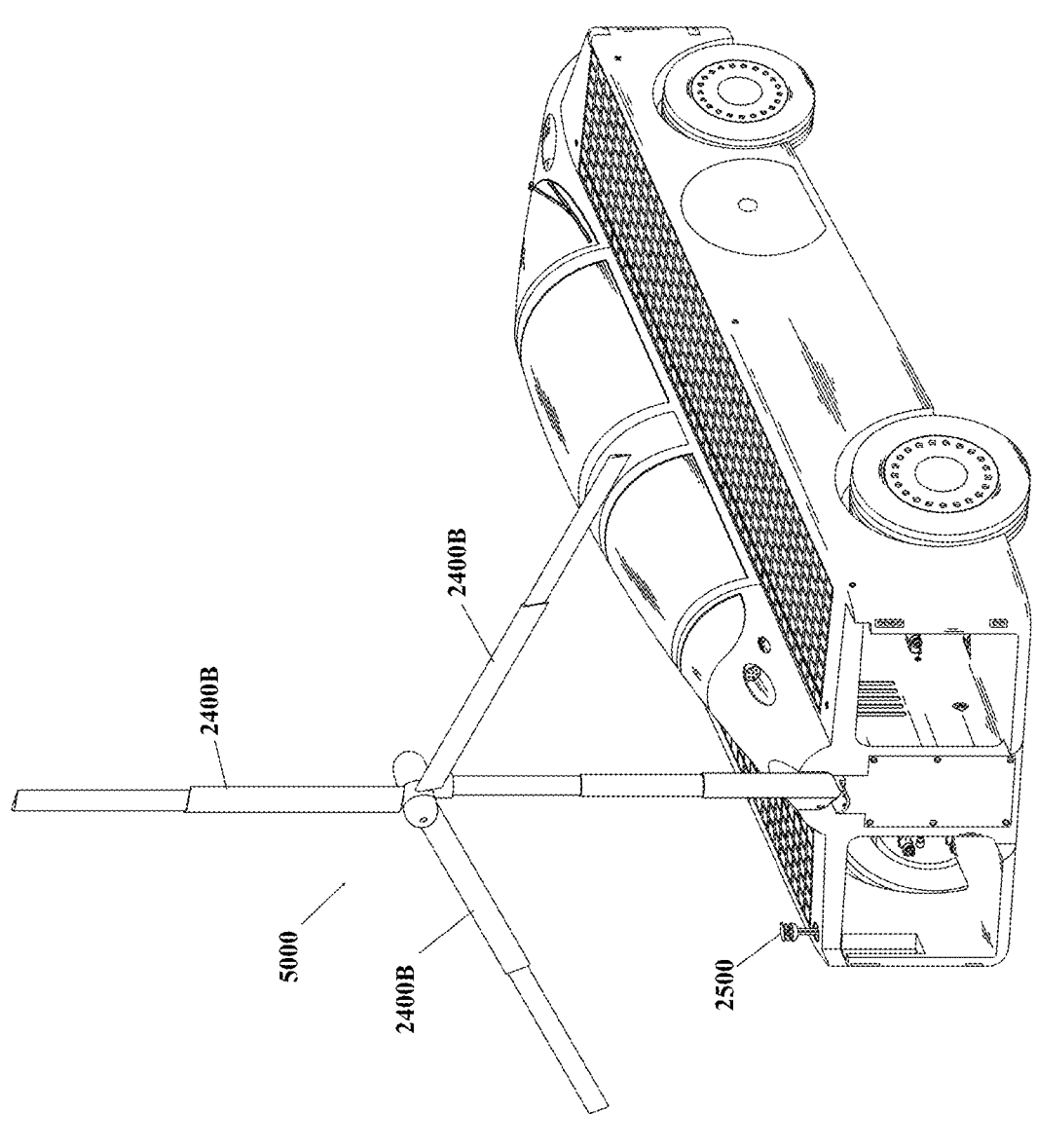
FIG. 37 is an illustration of an alternate example embodiment rear side perspective view of a vehicle shown with a three blade wind turbine assembly in a deployed position, according to some embodiments.

Referring to FIGS. 35, 36 and 37, an alternative embodiment example of a vehicle 100 is shown having an adjustable blade pitch rotor hub assembly 5000 mounted to the rear end section of a vehicle 100. Referring to FIG. 35 an adjustable blade pitch rotor hub assembly 5000 is shown in a stowed position.

Referring to FIG. 36, an adjustable blade pitch rotor hub assembly 5000 is shown in a deployed position attached to an extendable mast shown in an extended position and inner mounted extendable blades 2400B shown in an extended position including a stowable anemometer 2500 shown in a deployed position. Referring to FIG. 37, an adjustable blade pitch rotor hub assembly 5000 is shown with the inner mounted extendable blades 2400B shown having alternative pitch angles.

In another example the rear end section of a vehicle 100 may include a left blade slot 5200 and a right blade slot for housing the lower left and lower right blades of the adjustable blade pitch rotor hub assembly 5000. The vehicle 100 may include a right rear upper tail lights 5210a, a left rear upper tail lights 5210b, a right rear lower tail lights 5212a, and a left rear lower tail lights) 5212b.

In other examples the three blade hub configuration may be configured with two or more hubs with each hub having three blades that may be stowed behind the vehicle 100. In another example the extendable blades may be configured with more than two blades slidably arranged.

Anemometer Examples, Overview

Referring to FIGS. 25-26, an example embodiment of a stowable anemometer 2500 is shown that may provide wind speed and wind direction data in relation to the direction of the vehicle 100. Referring to FIG. 25, a stowable anemometer 2500 is shown in a deployed position and shown in a stowed position in FIG. 26. The stowable anemometer 2500 may include an anemometer 2510 that may be stored in a housing cup 2524 which is attached to an upper bracket 2548. The anemometer 2510 is attached to a post 2520, and may include ultrasonic wind sensors 2516 for measuring wind speed and wind direction, including a top cover 2512 and base 2518 which are attached by support columns 2514. This configuration provides for housing the sensors and their components, and for running wires within the post 2520 to the post wire harness connector 2530 which may provide a connection(s) to the vehicles 100 controls. The stowable anemometer 2500 may provide wind data to the vehicles 100 controls which may be used to manipulate a stowable HAWT assembly 1400 including wind tracking controls and devices, and may also be used to safeguard the vehicle 100 wind and solar generating components from extreme wind conditions.

The stowable anemometer 2500 may include a post groove 2522, which together with a sleeve stud 2526 attached inside a post sleeve 2528, may provide for keeping the anemometer 2510 aligned when being deployed or stowed, and may include a traveling nut 2532, attached to the bottom end of a post 2520 which is mated to a threaded rod 2534 which is connected to a motor 2536 which may allow the anemometer 2510 to be extended or retracted. A motor 2536 may be attached to a motor mount 2540 having a lower bracket 2542. A motor wire connector 2538 may provide a connection to the vehicles 100 controls that may manipulate the stowable anemometer 2500.

The stowable anemometer 2500 may be attached to the vehicle 100 using a plate 2546 which has at least one lower mounting stud 2544, and at least one upper mounting stud 2550. This configuration allows a stowable anemometer 2500 shown in FIGS. 25-26 to remain nestled within the vehicle 100 when stowed and to extend when being deployed. In examples where the stowable anemometer 2500 may be stowed, these stowed configurations may help to reduce the aerodynamic drag of the vehicle 100 when driven.

In another example the stowable anemometer 2500 shown may include ultrasonic wind sensors 2516 for providing wind speed and direction data, however any variety of sensors, designs and/or sensing technologies may be used including but not limited to cup, wind vane, propeller, ultrasonic, sonic, lidar, acoustic resonance, ultrasonic, laser Doppler, hot-wire, pitot-static tube, cup, vane or any combination of these. The positioning of such sensors may be in any of various places as shown in, but not limited to FIG. 25.

In another example the motor 2536 may include at least one gear or may be a stepper motor. In another example the motor 2536 may be any type of motor including but not limited to a stepper motor that may be manipulated by controls. In another example the motor may be a motor with rotational shaft control. In another example the anemometer 2500 may be configured with longer components that may allow for a longer extension than what is shown in the examples. In another example the stowable anemometer 2500 may be deployed manually or may be deployed automatically by controls. In another example initial wind measurements may also be provided by wind sensors mounted to the top cover 2512.

In another example, a stowable anemometer 2500 may be used for detecting unfavorable wind conditions thereby allowing the vehicles 100 controls to prevent a stowable solar panel assembly 2900 from deploying, and may also be used to retract a deployed stowable solar panel assembly 2900 partially or into a stowed position.

Anemometer Examples, Deployment

In a deployment phase example, a stowable anemometer 2500 may be partially deployed by controls when the vehicle 100 is parked, thereby allowing the wind sensors to initially measure wind conditions, when favorable wind conditions are detected, the stowable anemometer 2500 may then be fully extended. A motor 2536 having a threaded rod 2534 may be manipulated by controls to rotate allowing the threaded rod 2534 to move the mated traveling nut 2532 which is attached to the post 2520, thereby allowing the anemometer 2510 to extend.

Anemometer Examples, Stowing

In a stowing phase example, a stowable anemometer 2500 may be stowed when the vehicle 100 is no longer parked. Controls may detect the vehicle 100 being shifting from park to drive and then controls may manipulate a motor 2536 having a threaded rod 2534 to rotate allowing the threaded rod 2534 to move the mated traveling nut 2532 which is attached to the post 2520, thereby allowing the anemometer 2510 to retract.

In another deployment and/or stowing example, a stowable anemometer 2500 may be manipulated by wireless devices including but not limited to a smartphone.

Solar Examples, Overview

Referring to FIGS. 27-31, an example embodiment of a stowable solar panel assembly 2900 is shown in various extended positions that may be deployed by controls in favorable sun conditions, and may track the sun or may be stowed when sun conditions are no longer favorable. The stowable solar panel assembly 2900 may be housed within a rear solar panel assembly compartment 3550*a* and a front solar panel assembly compartment 3550*b* shown in FIG. 28.

An omni-directional sun sensor 174 shown in FIG. 7 may provide sun strength and/or sun tracking data to the vehicles 100 controls which may manipulate the stowable solar panel assembly 2900 into a deployed position that may be favorable for generating solar energy or into a stowed position.

Figure 30:
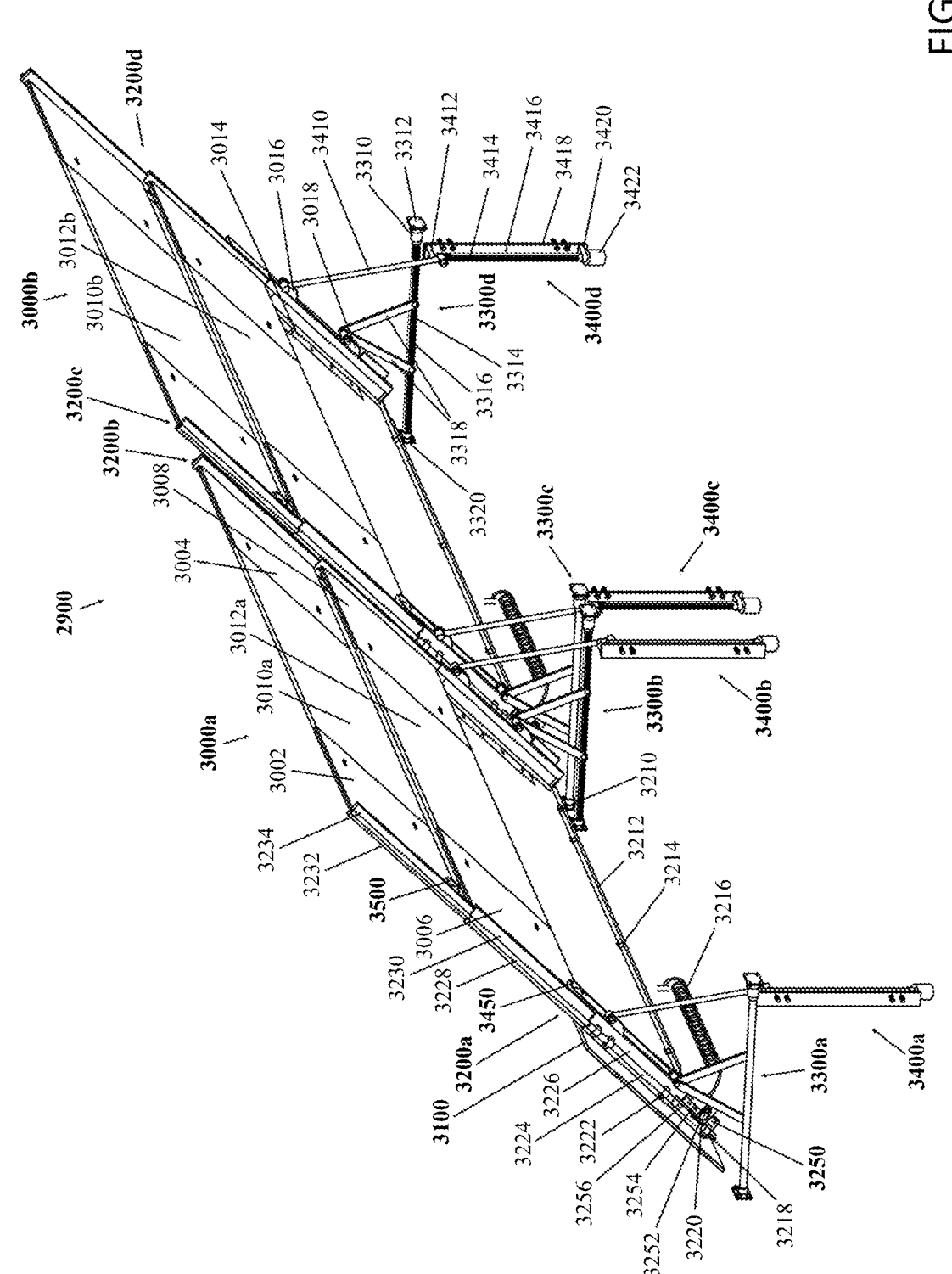
FIG. 30 is an illustration of an example perspective view of a stowable solar panel assembly shown dismounted from the vehicle in a deployed and tilted position, according to some embodiments.

Referring to FIG. 30, an example of a stowable solar panel assembly 2900 is shown comprised of a top side solar panel 3100 that may be attached to a rear panel assembly 3000*a* and a front panel assembly 3000*b*, both panel assemblies 3000*a*, 3000*b* may include a pair of rail assemblies shown as a right rail assembly 3200*a*, and a left rail assembly 3200*b*, and a right rail assembly 3200*c,* and a left rail assembly 3200*d.* The rear panel assembly 3000*a* may include a right upper mounting plate 3002, and a left upper mounting plate 3004 for mounting an upper solar panel 3010*a*, and a right middle mounting plate 3006, and a left middle mounting plate 3008 for mounting a lower solar panel 3012*a*. The upper and lower solar panels 3010*a*, 3012*a* may be connected to the vehicles 100 controls by electrical wires that may be routed through a middle panel spool assembly 3450, and a upper panel spool assembly 3500 where they are then routed to an electrical junction box where they are then routed to a wire harness coil 3216 that may then be connected to a charge controller 702 shown in FIG. 11. A rear panel assembly 3000*a* and a front panel assembly 3000*b* may have similar components.

The rail assemblies 3200*a,* 3200*b,* 3200*c,* and 3200*d* shown in FIG. 30 may each include mounting plates 3014 that may be used to attach to the top side solar panel 3100, and may each be configured as shown in an example of a right rail assembly 3200*a* which includes an outer rail 3226, a middle rail 3230, and an inner rail 3234 that are slidably arranged wherein the inner rail 3234 is slidably received in the middle rail 3230 and the middle rail is slidably received in the outer rail 3226. The outer, middle and inner rails are sized that allows the inner rail to be retracted into a middle rail and a middle rail to be retracted into an outer rail thereby allowing the inner and middle rails to extend or retract in a telescopic manner. The middle and inner rails may each include a solar panel mounting plate as shown in an example of a middle rail 3230 attached to a right middle mounting plate 3006 and an inner rail 3234 attached to a right upper panel mounting plate 3002. The mounting plates 3002, and 3004 allows for the upper solar panel 3010a to be attached to the inner rails as shown in 3234 and the mounting plates 3006, and 3008 allows for attaching the lower solar panel 3012a to the inner rails as shown in 3234. This configuration allows attaching the upper solar panels to the inner rails and for attaching the lower solar panels to the middle rails in a slidable arrangement thereby allowing the upper and lower solar panels to extend or retract.

Referring to FIG. 30, an example of a telescopic tube structure may include an outer cable tube 3224, middle cable tube 3228, and an inner cable tube 3232 that may attach to the outer rails 3226 with at least one outer tube hanger 3222 and may include a rail cable housing 3212 that may be attached to the top side solar panel 3100 by at least one rail cable housing hanger 3214. The outer, middle and inner cable tubes are slidably arranged so that the inner tube can be retracted into the middle tube and the middle tube can be retracted into the outer tube thereby allowing the cable tubes to extend or retract in a telescopic manner.

An example of a motor assembly 3250 shown in FIG. 30 may include a mounting plate 3256 which may be attached to the outer rail 3226. A threaded cable 3220 housed in the rail cable housing 3212 may be attached within an inner cable tube 3232 which is attached to the end of an inner rail 3234. A threaded cable 3220 is mated to a transfer gear 3252 which is mated to a motor and worm gear shaft assembly 3254. This configuration allows the vehicles 100 controls to manipulate the motor and worm gear shaft assembly 3254 allowing the telescopic tube structures to extend or retract thereby also allowing the rail assemblies 3200a, 3200b, 3200c and 3200d and their attachment components to extend or retract as the threaded cable 3220 moves out into the extending telescopic tube structure when being deployed or retracts back into the rail cable housing 3212 when being stowed. A right rail assembly lower proximity sensor 3210, and a right rail assembly upper proximity sensor 3218 may be used by the vehicles 100 controls to prevent an over extension or over retraction of the threaded cable 3220.

In other examples the motor of the motor and worm gear shaft assembly 3254 may be a stepper motor that may include one or more various gears. In another example the motor may be any type of motor including but not limited to a stepper motor that may be manipulated by controls. In another example the motor may be a motor with rotational shaft control.

The rail assemblies 3200a, 3200b, 3200c, and 3200d shown in FIG. 30 may each include an outer rail link mount attached to a lifter assembly 3300a, 3300b, 3300c, 3300d and may each include an inner rail link mount attached to a tilting assembly 3400a 3400b 3400c 3400d. The example shown includes an inner rail link mount 3018 attached pivotally to a pair of links 3318 which are attached to a pair of traveling nuts mounted on a threaded rod 3316 housed within a barrel 3314 of a left lifter assembly 3300d.

A threaded rod 3316 attached to the motor 3310 allows a pair of traveling nuts to spread apart when rotated in one direction which may lower the rails 3200a, 3200b, 3200c, 3200d, and to allow the traveling nuts to move towards each other when the rotation is reversed which may lift the rails.

The lifter assemblies 3300a, 3300b, 3300c, 3300d may include the same components as a left lifter assembly 3300d shown in FIG. 30 and may include a motor frame mount 3312 that may be used to attach to the vehicle 100 and may also provide for attaching the right end of a threaded rod 3316, a barrel 3314, and a motor 3310, and may include a bearing frame mount 3320 that allows for attaching the other end to the vehicle100 and may also provide for attaching the left end of a threaded rod 3316, and a barrel 3314. The lifter assembly motor 3310 may be any type of motor including but not limited to a stepper motor that may be manipulated by controls. In another example the motor may be a motor with rotational shaft control.

The examples shown includes an outer rail link mount 3016 attached pivotally to a lifter link arm 3410 which is attached to a traveling nut mounted on threaded rod 3414 housed in barrel 3416 of a tilting assembly 3400d. The tilting assembly 3400d may further include an upper bearing barrel mount 3412 for attaching the upper end of the threaded rod 3414 and barrel 3416, a mounting plate 3418 for mounting to the vehicle 100, a motor mount 3420 for mounting the lower end of a threaded rod 3414 and barrel 3416 and for mounting the motor 3422. The tilting assembly motors 3422 may be any type of motor including but not limited to a stepper motor that may be manipulated by controls. In another example the motor may be a motor with rotational shaft control.

The rail assemblies 3200a, 3200b, 3200c, and 3200d shown in FIG. 30 may each be attached to an outer rail link mount as shown in one example 3016 that may be used to attach to tilting assemblies shown in the example as a right tilting assembly 3400a, a left tilting assembly 3400b, a right tilting assembly 3400c, and a left tilting assembly 3400d. Each tilting assembly may include a lifter link arm as shown in one example 3410 which may provide a connection to the rail assemblies' outer link mounts.

The tilting assemblies 3400a, 3400b, 3400c, and 3400d may each having traveling nuts that may be mounted to a threaded rod attached to a motor that may be manipulated by controls that allows the threaded rod to rotate allowing the traveling nuts to extend or retract the lifter link arm 3410 which are attached to the rail assemblies' 3200a, 3200b, 3200c, 3200d outer link mounts as shown in one example outer link mount 3016. This configuration allows the vehicles 100 controls, including data from an omni-directional sun sensor 174 shown in FIG. 7 to manipulate a stowable solar panel assembly 2900 into various extended and/or tilted positions. In another example the lifter assemblies 3300a, 3300b, 3300c, 3300d and the tilting assemblies 3400a, 3400b, 3400c, 3400d may be manipulated by the vehicles 100 controls to alternate functions between lifting and tilting in any combination thereby allowing a stowable solar panel assembly 2900 to be capable of omnidirectional tilting.

Solar Examples, Other Examples

In another example the stowable solar panel assembly 2900 shown in FIG. 30 may be configured with less slidable solar panels or more slidable solar panels than shown.

In another example the stowable solar panel assembly 2900 shown in FIG. 30 may be comprised of two separate top side solar panels wherein a front portion top side solar panel is attached to a rear panel assembly 3000a and a rear portion top side solar panel is attached to a front panel assembly 3000*b*. This configuration allows two separate stowable solar panel assemblies to be independently manipulated by controls.

Solar Examples, Deployment

Figure 2:
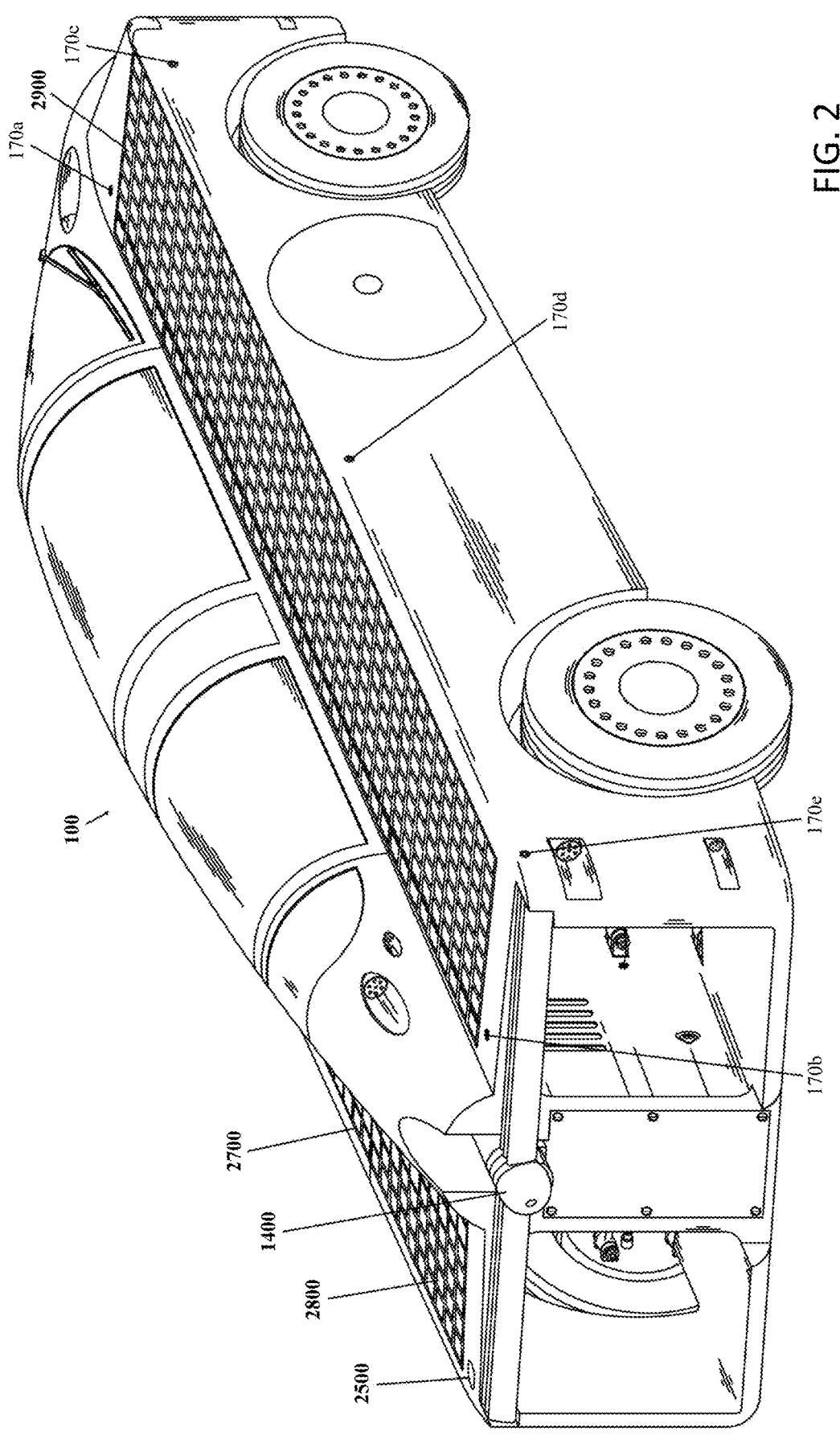
FIG. 2 is an illustration of an example rear side perspective view of a vehicle, according to some embodiments.
Figure 27:
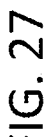
FIG. 27 is an illustration of an example rear side perspective view of a vehicle and a stowable anemometer shown in a deployed position and a stowable solar panel assembly shown in a deployed position, according to some embodiments.
Figure 28:
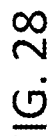
FIG. 28 is an illustration of an example rear side perspective view of a vehicle shown with a stowable anemometer in a deployed position and a stowable solar panel assembly in a deployed position, according to some embodiments.
Figure 29:
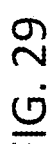
FIG. 29 is an illustration of an example rear side perspective view of a vehicle shown with a stowable anemometer in a deployed position and a stowable solar panel assembly in a deployed position, according to some embodiments.

In a deployment phase example, when favorable sun conditions are detected by an omni-directional sun sensor 174 shown in FIG. 7, including sensing data provided by proximity sensors 170*a*, 170*b*, 170*c*, 170*d* shown in FIG. 2 that sense no obstructions in the path of a deploying stowable solar panel assembly 2900, the vehicles 100 controls may then manipulate the stowable solar panel assembly 2900 shown in FIG. 30 by activating the lifter assemblies 3300*a*, 3300*b*, 3300*c*, 3300*d* and tilting assemblies 3400*a*, 3400*b*, 3400*c*, 3400*d* to lift the stowable solar panel assembly 2900, and then by activating a motor assembly 3250 to partially or fully extend the upper and lower solar panels 3010*a*, 3012*a*, 3010*b*, 3012*b*. An omni-directional sun sensor 174 may provide sun strength and/or sun tracking data to the vehicles 100 controls which may tilt the stowable solar panel assembly 2900 by manipulating the tilting assemblies 3400*a*, 3400*b*, 3400*c*, and 3400*d* to track the sun as shown in FIGS. 28-29. The lifter assemblies and tilting assemblies may also allow a horizontal deployment as shown in FIG. 27.

Solar Examples, Stowing

In a stowing phase example, when an omni-directional sun sensor 174 shown in FIG. 7 detects unfavorable sun conditions, the vehicles 100 controls may then manipulate the stowable solar panel assembly 2900 by activating the motor assembly 3250 shown in FIG. 30 to retract the upper and lower solar panels 3010*a*, 3012*a*, 3010*b*, 3012*b* and then activate the lifter assemblies 3300*a*, 3300*b*, 3300*c*, 3300*d* to lower the stowable solar panel assembly 2900 and then activate the tilting assemblies 3400*a*, 3400*b*, 3400*c*, 3400*d* to lower the stowable solar panel assembly 2900 into a rear solar panel assembly compartment 3550*a* and a front solar panel assembly compartment 3550*b* shown in FIG. 28 thereby completing the stowing phase.

Solar and Wind Examples, Combined Deployment

Figure 31:
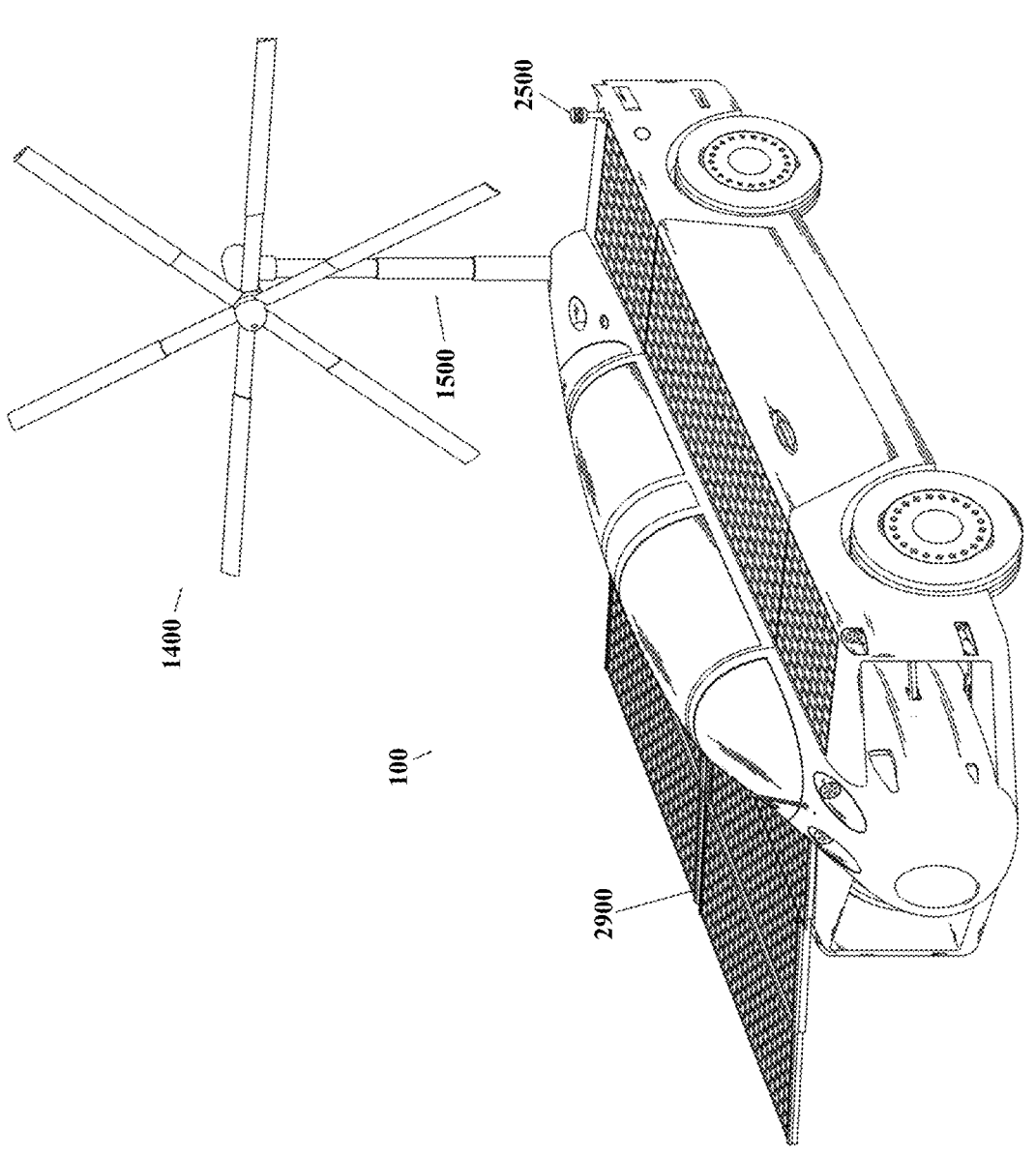
FIG. 31 is an illustration of an example front side perspective view of a vehicle comprising a stowable wind turbine assembly shown in a deployed position, and a stowable solar panel assembly shown deployed in a level position, and a stowable anemometer shown in a deployed position, according to some embodiments.

Referring to FIG. 31, an example embodiment of a vehicle 100 is shown having a stowable horizontal axis wind turbine assembly 1400 and a stowable solar panel assembly 2900 deployed simultaneously, wherein each assembly may be separately manipulated by controls into various deployed positions.

Solar Examples, Overview Slide-Out (Alternative Embodiment)

Figure 32:
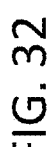
FIG. 32 is an alternate example embodiment of a stowable solar panel assembly and is illustrated as a slidable solar panel assembly shown in a stowed position, according to some embodiments.
Figure 33:
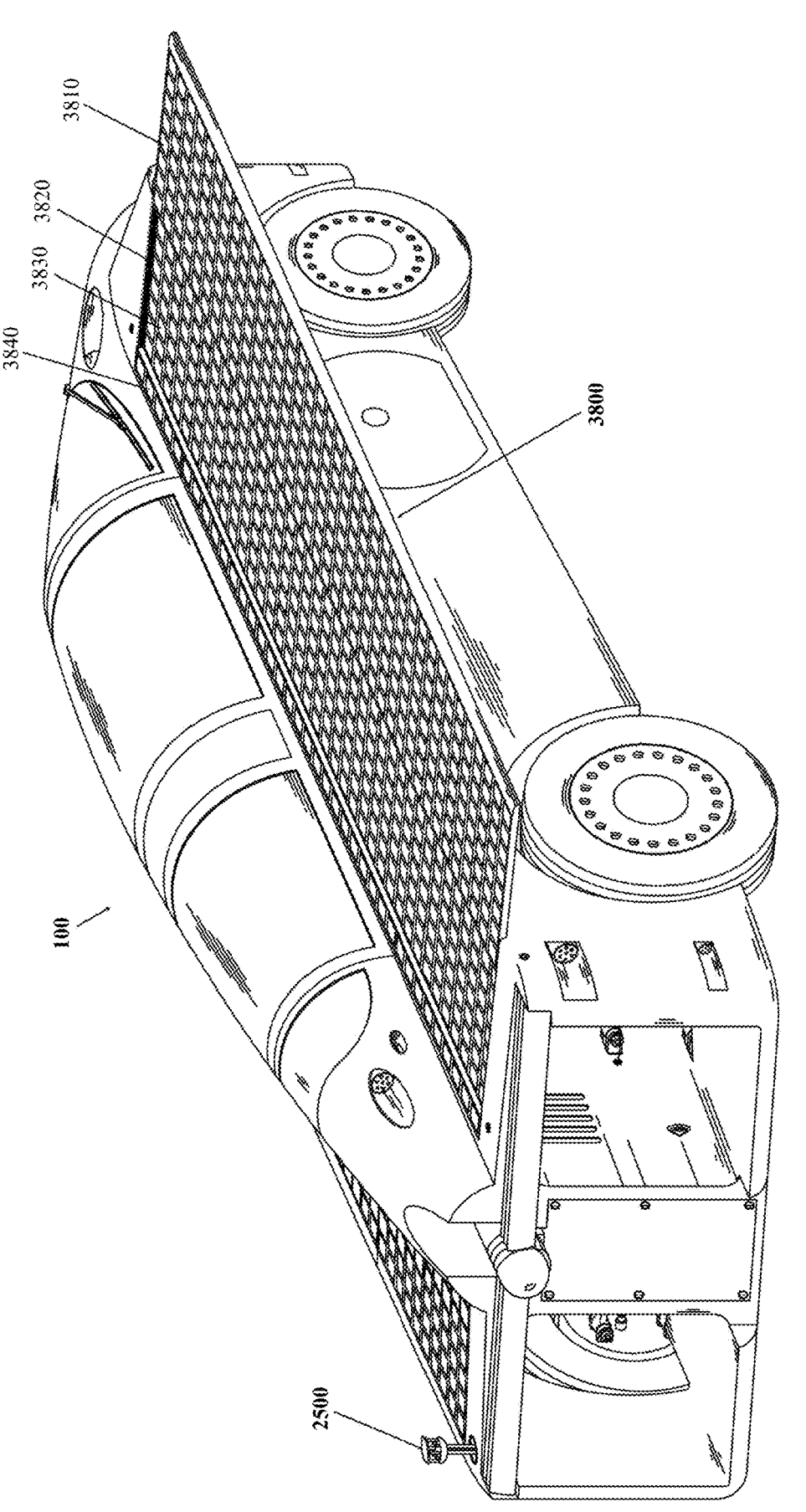
FIG. 33 is an alternate example embodiment of a stowable solar panel assembly and is illustrated as a slidable solar panel assembly shown in a deployed position, according to some embodiments.

Referring to FIGS. 32-33, an example embodiment of a vehicle 100 is shown having wind energy and solar energy generating components. Referring to FIG. 32, a stowable HAWT assembly 1400 is shown in a stowed position and a slidable solar panel assembly 3800 is shown in a stowed position. Referring to FIG. 33, a slidable solar panel assembly 3800 is shown in a deployed position.

Referring to FIG. 33, an example embodiment of a slidable solar panel assembly 3800 and a bottom solar panel 3830 is shown which may be comprised of one or more solar panels, and a topside inner solar panel strip 3840 is shown which may be comprised of one or more solar panel strips. Extending the top slidable solar panel 3810 allows the bottom solar panel 3830 to be exposed to the sun, thereby providing additional solar generating capacity.

Solar Examples, Slide-Out Deployment

In a deployment phase example, when favorable sun conditions are detected by an omni-directional sun sensor 174 shown in FIG. 7, including sensing data provided by proximity sensors 170*a*, 170*b*, 170*c*, 170*d* shown in FIG. 2 that sense no obstructions in the path of a deploying slidable solar panel assembly 3800, the vehicles 100 controls may then manipulate a pair of actuator assemblies 3820 shown in one example in FIG. 33 to extend the slidable solar panel assembly 3800 into a deployed position.

The actuator assemblies 3820 may be located at opposite ends and may each include a motor attached to a threaded rod having a traveling nut housed in a barrel. The top slidable solar panel 3810 may be attached to at least one traveling nut of each actuator assembly 3820 thereby allowing the actuator assemblies 3820 to extend or retract the top slidable solar panel 3810.

Solar Examples, Slide-Out Stowing

In a stowing phase example, when an omni-directional sun sensor 174 shown in FIG. 7 detects unfavorable sun conditions, the vehicles 100 controls may then manipulate the slidable solar panel assembly 3800 shown in FIG. 33 into a stowed position by manipulating the actuator assemblies 3820 to retract the top slidable solar panel 3810 thereby completing the stowing phase.

Solar Examples, Slide-Out Other Examples

In other examples the slidable solar panel assembly 3800 may be configured with two or more solar panels that may be slidably arranged.

CONCLUSION

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled and/or monitored using any number of combinations of hardware, firmware, and/or as data and/or instructions embodied in various machine-readable or computer-readable media, in terms of their behavioral, register transfer, logic component, and/or other characteristics including but not limited to a cell phone or network card or any type of wireless device. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated, etc.

The invention claimed is:

1. A vehicle, comprising,
a main body chassis with a cabin, a rear portion, at least one electric motor, and four wheels;
a solar subsystem, attached to the main body chassis,
wherein the solar subsystem includes a plurality of solar panels disposed on a top side of the main body chassis and disposed adjacent to the cabin,
wherein the plurality of solar panels are configured to extend and retract, relative to the main body chassis; and
a wind generation subsystem, attached to the main body chassis,
wherein the wind generation subsystem includes a telescoping mast and a horizontal-axis wind turbine assembly disposed at the rear portion of the main body chassis, the horizontal-axis wind turbine assembly including at least one rotor hub configured with at least two turbine blades attached to the rotor hub, wherein the telescoping mast is configured to extend vertically from the rear portion to deploy the at least two turbine blades attached to the rotor hub of the horizontal-axis wind turbine assembly.

2. The vehicle of claim 1 further comprising controls in the main body chassis.

3. The vehicle of claim 2 wherein the controls are configured to manipulate the extension or retraction of the plurality of solar panels from the solar subsystem.

4. The vehicle of claim 2 wherein the controls are configured to control the tilt of the plurality of solar panels.

5. The vehicle of claim 2 wherein the controls are configured to control the extension or retraction of the extendable mast using wires housed in a retractable coil cord coiled around an inner mast.

6. The vehicle of claim 1 wherein the horizontal-axis wind turbine assembly includes the two turbine blades that are positioned opposite one another with its blades spaced equally apart at 180 degrees from each other.

7. The vehicle of claim 1 wherein the at least two blades are configured to extend or retract from the rotor hub to increase or decrease a rotor diameter of the horizontal-axis wind turbine.

8. The vehicle of claim 1 further comprising a battery pack including a plurality of battery modules arranged in a tandem configuration and housed in the cabin.

9. The vehicle of claim 8 wherein the main body chassis includes at least two seats in tandem mounted on an upper surface of the battery pack disposed in the main body chassis.

10. The vehicle of claim 1 wherein the main body chassis has an air tunnel on each side of the main body chassis.

11. The vehicle of claim 10 wherein the vehicle includes an upper control arm and a lower control arm attached to each wheel.

12. The vehicle of claim 1 wherein the telescoping mast is configured to be raised or lowered vertically on a rear section of the main body chassis using an inner mast lifter belt.

13. The vehicle of claim 12 wherein the telescoping mast is stowable vertically inside the main body chassis.

14. The vehicle of claim 1 wherein the main body chassis includes a stowable ultrasonic anemometer to measure wind direction and speed and configured to be manually or automatically raised or lowered vertically on the rear section of the main body chassis.

15. A system comprising:

a main body chassis with a cabin, a rear portion, at least one electric motor, and four wheels;

a plurality of solar panels on a top side of the main body chassis and disposed adjacent to the cabin, wherein of the plurality of solar panels are configured to extend and/or tilt, relative to the main body chassis; and a stowable horizontal-axis wind turbine assembly disposed within the rear portion of the main body chassis, the stowable horizontal-axis wind turbine assembly including a telescoping mast and the horizontal-axis wind turbine assembly, the horizontal-axis wind turbine assembly including a rotor hub and at least two turbine blades attached to the rotor hub, wherein the telescoping mast is configured to extend vertically from the rear portion to deploy the at least two turbine blades attached to the rotor hub of the horizontal-axis wind turbine assembly.

16. The system of claim 15 including an ultrasonic anemometer in communication with a computing system for controlling the stowable horizontal-axis wind turbine assembly and the plurality of solar panels, and configured to send and receive data regarding sensed wind direction and speed;

wherein the telescoping mast is attached to the horizontal-axis wind turbine assembly yaw drive configured to twist;

wherein the computing system is in communication with at least one motor having a worm gear disposed adjacent to the telescoping mast, and the computing system is configured to control twisting of the horizontal-axis wind turbine assembly through a yaw drive, based on data received from the ultrasonic anemometer.

17. The system of claim 16 wherein the computing system is further configured to control an angle of attack of the at least two turbine blades attached to the rotor hub, based on the data received from the ultrasonic anemometer, wherein each of the at least two turbine blades are attached to a pitch assembly motor disposed within the rotor hub.

18. The system of claim 16 including an omnidirectional sun sensor in communication with the computing system, configured to send and receive data regarding sensed sun position and sun strength relative to the main body chassis.

19. The system of claim 18 wherein the computing system is further configured to control an angle of tilt and amount of extension of the solar panels, based on the data received from the omnidirectional sun sensor.

20. The system of claim 15 wherein the main body chassis includes a central body structure with an air tunnel on each side of the central body structure, wherein the air tunnel on each side of the central body structure includes a generally horizontal top portion and side portions, the generally horizontal top portion including the plurality of the solar panels.

21. The system of claim 20 wherein the main body chassis includes a horizontally arranged and pivotally attached cabin door, the cabin door including a canopy structure and an upper deck, the upper deck including a portion of one of the air tunnels generally horizontal top portions and side portions, wherein the cabin door includes a pair of canopies that are each attached by a pair of pin hinge assemblies configured to allow each canopy to swing up and away from the door or allow to be detached from the door.

22. The system of claim 15 further comprising dampers for cooling the plurality of solar panels, wherein the dampers are attached to the main body chassis by at least one hinge, wherein each damper has an attached motor that in communication with a set of controls to control a flap position of each damper.

* * * * *